United States Patent
Olson et al.

(10) Patent No.: US 10,975,251 B2
(45) Date of Patent: Apr. 13, 2021

(54) UV-ABSORBING COATING INCLUDING ZINC OXIDE NANOPARTICLES

(71) Applicant: Iowa State University Research Foundation, Inc., Ames, IA (US)

(72) Inventors: Emily Jane Olson, Ames, IA (US); Shan Jiang, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 16/716,168

(22) Filed: Dec. 16, 2019

(65) Prior Publication Data

US 2020/0199377 A1 Jun. 25, 2020

Related U.S. Application Data

(60) Provisional application No. 62/784,109, filed on Dec. 21, 2018.

(51) Int. Cl.
| | | |
|---|---|---|
| *C09D 5/32* | (2006.01) | |
| *C08L 1/02* | (2006.01) | |
| *C08K 3/013* | (2018.01) | |
| *C08K 3/22* | (2006.01) | |
| *C08K 9/06* | (2006.01) | |

(52) U.S. Cl.
CPC .............. *C09D 5/32* (2013.01); *C08K 3/013* (2018.01); *C08K 3/22* (2013.01); *C08K 9/06* (2013.01); *C08L 1/02* (2013.01); *C08K 2003/2296* (2013.01); *C08K 2201/005* (2013.01); *C08L 2201/08* (2013.01); *C08L 2201/10* (2013.01); *C08L 2203/10* (2013.01); *C08L 2203/16* (2013.01)

(58) Field of Classification Search
CPC ......... C09D 5/32; C08L 1/02; C08L 2201/08; C08L 2201/10; C08L 2203/10; C08L 2203/16; C08K 3/013; C08K 3/22; C08K 9/06; C08K 2003/2296; C08K 2201/005
See application file for complete search history.

(56) References Cited

U.S. PATENT DOCUMENTS

| | | | |
|---|---|---|---|
| 6,531,223 B1 * | 3/2003 | Rota ........................ | C09D 7/61 428/402 |
| 2008/0176986 A1 * | 7/2008 | Burgard ................... | C01G 9/02 524/432 |
| 2008/0248289 A1 | 10/2008 | Jonschker et al. | |

(Continued)

FOREIGN PATENT DOCUMENTS

WO WO2008118422 10/2008

OTHER PUBLICATIONS

Espitia, PJ. P., "Zinc Oxide Nanoparticles for Food Packaging Applications", Antimicrobial Food Packaging. http: dx.doi.org 10.1016 B978-0-12-800723-5.00034-6, (2016), 425-431.

(Continued)

*Primary Examiner* — Bijan Ahvazi
(74) *Attorney, Agent, or Firm* — Schwegman Lundberg & Woessner, P.A.

(57) ABSTRACT

Various embodiments disclosed relate to visually transparent UV-absorbing coatings including ZnO nanoparticles. The coating includes ZnO nanoparticles, hydroxy($C_1$-$C_{10}$)alkyl cellulose, a dispersant, and less than about 5 wt % water.

11 Claims, 15 Drawing Sheets

(56) References Cited

U.S. PATENT DOCUMENTS

| | | | |
|---|---|---|---|
| 2010/0040567 A1* | 2/2010 | Katusic | A61Q 17/04 |
| | | | 424/59 |
| 2011/0070173 A1* | 3/2011 | Yoshida | A61K 8/73 |
| | | | 424/59 |
| 2013/0022655 A1 | 1/2013 | Sachweh et al. | |
| 2018/0194641 A1* | 7/2018 | Beier | C01G 23/047 |

OTHER PUBLICATIONS

Hussein, Jihan, "Biocompatible zinc oxide nanocrystals stabilized via hydroxyethyl cellulose for mitigation of diabetic complications", International Journal of Biological Macromolecules 107, (2018), 748-754.

* cited by examiner

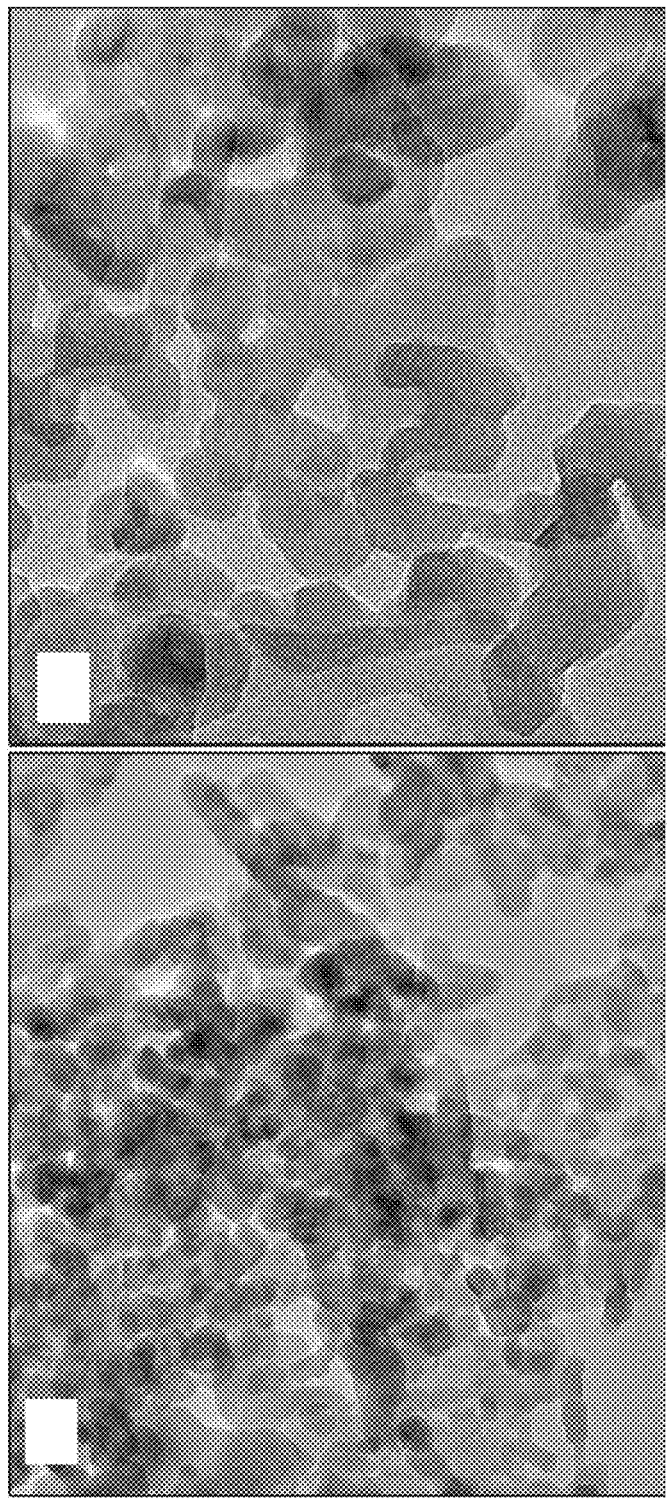

UV-ABSORBING COATING INCLUDING ZINC OXIDE NANOPARTICLES

CROSS-REFERENCE TO RELATED APPLICATION

This application claims the benefit of priority to U.S. Provisional Patent Application Ser. No. 62/784,109 filed Dec. 21, 2018, the disclosure of which is incorporated herein in its entirety by reference.

BACKGROUND

Ultraviolet (UV) protection is critical to human skin health and material preservation. There are three types of UV radiation: UVA (320-400 nm). UVB (290-320 nm), and UVC (290-100 nm). Though UVC is absorbed by the atmosphere. UVA and UVB radiation reach the earth at 95% and 5% of the total UV radiation, respectively. Generally, excessive exposure to sunlight induces degradation of organic materials, loss of mechanical strength, and fading of pigments. Therefore, various industries have a great level of interest in protective coatings with UV-blocking capability to prevent photo degradation. The same principle can be extended to food protection. In meat packaging. UV protection can help prevent myoglobin rich meats from fading in color. There is also significant interest in utilizing UV protection for plastic bottles to maintain the taste of dairy or prevent vitamins from degradation for sports drinks or juices. In addition, in transparent bags, lipid rich snacks undergo oxidative rancidity, and UV protection could slow the process and enhance the shelf life.

Conventional views are that ZnO particles need to be dispersed to provide good transparency and UV-blocking. This limits the concentration of the ZnO particles, which in turn limits the extent to which UV-blocking films containing ZnO particles can be made thin.

SUMMARY OF THE INVENTION

In various embodiments, the present invention provides a UV-absorbing coating including ZnO nanoparticles, hydroxy($C_1$-$C_{10}$)alkyl cellulose, a dispersant, and less than 5 wt % water. Various embodiments provide a textile coating, sunscreen, food coating, or plastic film that includes the UV-absorbing coating.

In various embodiments, the present invention provides a UV-absorbing coating. The coating includes silane-modified ZnO nanoparticles having a particle size of about 20 nm to about 200 nm, wherein the ZnO nanoparticles are about 40 wt % to about 50 wt % of the coating. The coating includes a binder including hydroxyethyl cellulose or hydroxypropyl cellulose, wherein the binder is about 20 wt % to about 35 wt % of the coating. The coating includes a dispersant that is about 20 wt % to about 35 wt % of the coating. The coating includes less than about 1 wt % water. The coating includes aggregates including the ZnO nanoparticles, wherein the average squared distance from any point in the aggregates to their respective center of mass is about 120 nm to about 180 nm, and wherein the average number of ZnO particles in each aggregate is about 500 to about 2.500. The coating has a visible transmittance (600 nm) of greater than about 70%. The coating has a UVA absorbance (354 nm) of greater than about 90%. The coating has a thickness of about 0.2 microns to about 2 microns.

In various embodiments, the present invention provides a coating composition for forming the coating. The coating composition includes the ZnO nanoparticles, the binder including hydroxy($C_1$-$C_{10}$)alkyl cellulose, the dispersant, and water.

In various embodiments, the present invention provides a method of forming a UV-absorbing coating. The method includes applying a coating composition to a substrate, the coating composition including a binder including hydroxy($C_1$-$C_{10}$)alkyl cellulose, ZnO nanoparticles, and a dispersant. The method also includes drying the applied coating composition, to form the UV-absorbing coating.

In various embodiments, the present invention has advantages over other UV-blocking films, such as other ZnO nanoparticle-containing UV-blocking films, at least some of which are unexpected. For example, in various embodiments, the UV-blocking coating of the present invention provides higher UV-blocking efficiency than other films, including as compared to other ZnO nanoparticle-containing films, such as other ZnO nanoparticle-containing films having similar weight percent of ZnO nanoparticles, allowing the use of a thinner film to provide equivalent UV-blocking and transparency. In various embodiments, the high UV-blocking efficiency allows the use of a thinner film to provide equivalent UV-blocking and transparency. In various embodiments, the UV-blocking coating of the present invention can be formed without dispersing the ZnO nanoparticles in the coating (but with dispersion in the coating formulation), contrary to conventional views which dictate that a lack of dispersion leads to aggregate formation and loss of UV-blocking and transparency.

BRIEF DESCRIPTION OF THE FIGURES

The drawings illustrate generally, by way of example, but not by way of limitation, various embodiments of the present invention.

FIG. 2(a) illustrates a transmission electron microscopy (TEM) micrograph of a ZnO commercial dispersion at low magnification with a 100 nm scale bar, in accordance with various embodiments.

FIG. 2(b) illustrates a TEM micrograph of a ZnO commercial dispersion at high magnification with a 20 nm scale bar, in accordance with various embodiments.

DETAILED DESCRIPTION OF THE INVENTION

Figures 1A, 1B:
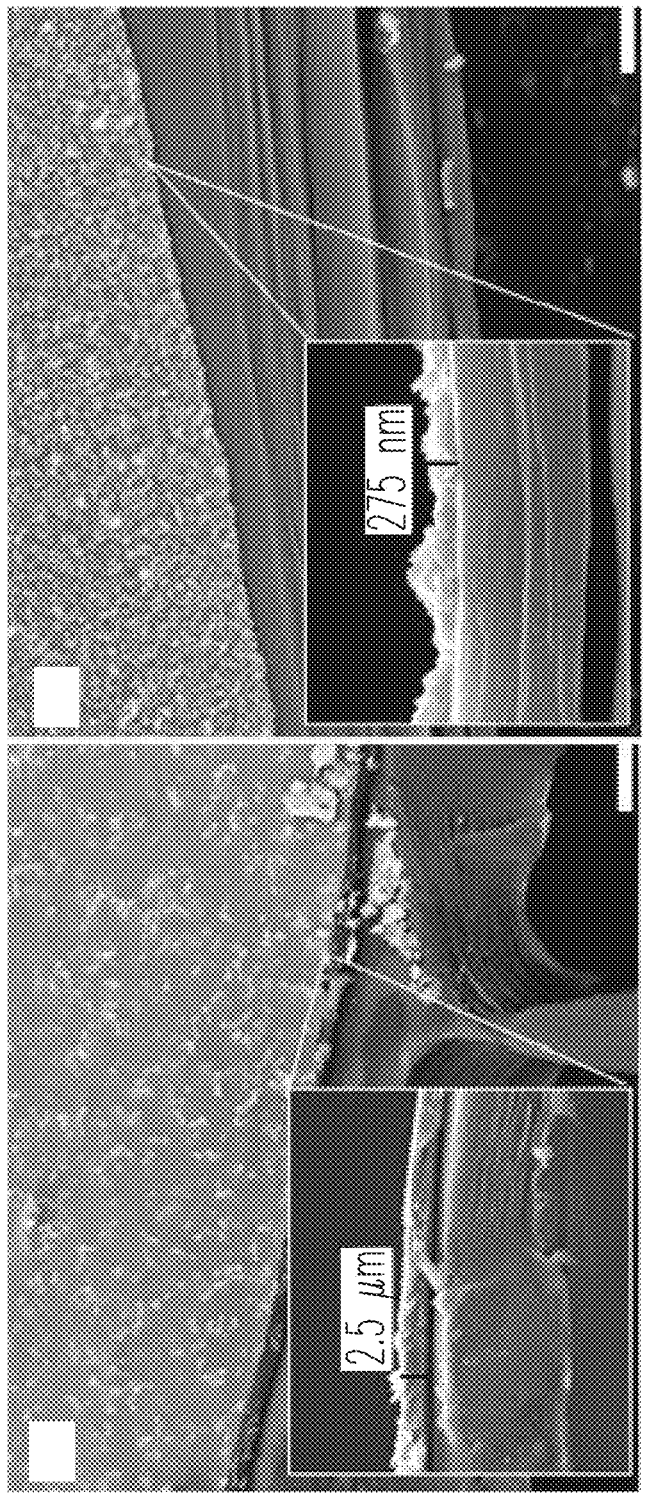
FIG. 1(a) illustrates a scanning electron microscopy (SEM) micrograph of coating thickness on polyethylene terephthalate (PET) plastic, with 90,000 g/mol hydroxyethyl cellulose (HEC) with ZnO dispersion and Tween 20, in accordance with various embodiments.
FIG. 1(b) illustrates a SEM micrograph of coating thickness on PET plastic, with 1,300,000 g/mol HEC with ZnO dispersion and Tween 20, in accordance with various embodiments.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y. or about Z" has the same meaning as "about X, about Y. or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl, wherein a and b are integers and mean having any of a to b number of carbon atoms. For example, $(C_1-C_4)$hydrocarbyl means the hydrocarbyl group can be methyl $(C_1)$, ethyl $(C_2)$, propyl $(C_3)$, or butyl $(C_4)$, and $(C_0-C_b)$hydrocarbyl means in certain embodiments there is no hydrocarbyl group.

As used herein, the term "polymer" refers to a molecule having at least one repeating unit and can include copolymers.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n=\Sigma M_i n_i/\Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i/\Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

UV-Absorbing Coating.

In various embodiments, the present invention provides a UV-absorbing coating. The UV-absorbing coating includes ZnO nanoparticles, a binder including hydroxy($C_1$-$C_{10}$) alkyl cellulose, a dispersant, and less than about 5 wt % water.

The coating can be a dried, flexible, and highly visually transparent coating. The coating can be a film. The coating can be a nanocomposite including the ZnO nanoparticles, the binder, and the dispersant. The ZnO nanoparticles can be bridged together by the binder. The coating can include branch-like clusters including the ZnO nanoparticles that are bridged together with the binder. The coating can include a fractal hierarchical self-assembly of the ZnO nanoparticles.

The coating can have any suitable thickness, such as a thickness of about 0.01 microns to about 100 microns, about 0.2 microns to about 2 microns, or about 0.01 microns or less, or less than, equal to, or greater than about 0.05 microns, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.5, 4, 4.5, 5, 6, 8, 10, 12, 14, 16, 18, 20, 25, 30, 35, 40, 45, 50, 60, 70, 80, 90 microns, or about 100 microns or more.

The coating can be highly visually transparent. The coating can have a visible transmittance (600 nm) of greater than about 60%, or greater than 70%, such as 60% to about 90%, 70% to about 80%, or greater than or equal to 60%, or less than, equal to, or greater than 62%, 64, 66, 68, 70, 72, 74, 76, 78, 80, 82, 84, 86, 88, 90, 92, 94, 96, 97, 98%, or about 99% or more.

The coating can be highly absorbent toward UVA light. For example, the coating can have a UVA absorbance (354 nm) of greater than about 80%, or greater than 90%, such as about 80% to about 99%, about 90% to about 98%, or greater than or equal to 80%, or less than, equal to, or greater than about 82%, 84, 86, 88, 90, 91, 92, 93, 94, 95, 96, 97, 98, 99, 99.5, or about 99.9%.

The coating or the coating composition can include any suitable additional material in addition to the ZnO nanoparticles, binder, and dispersant. For example, the coating can further include a suitable photostabilizing antioxidant. The coating can include nanoparticles other than the ZnO nanoparticles such as $TiO_2$ nanoparticles.

The coating is a dried coating that can include any suitable amount of water. The coating can include less than about 5 wt % water, or less than about 1 wt % water, or less than about 0.001 wt % water, or about 0 wt % to about 4.9 wt % water, or less than, equal to, or greater than about 0.001 wt % water, 0.005, 0.01, 0.05, 0.1, 0.5, 1, 1.5, 2, 2.5, 3, 3.5, 4, 4.5, or about 4.9 wt % or less.

The coating can be used for any suitable purpose. The coating can be a textile coating, a food coating (e.g., a coating for fruits or vegetables), a component of a sunscreen, or a component of a plastic film. The coating can be a component of a plastic wrap, a food protection wrap, a meat packaging film, a plastic bottle, a plastic bag, or a combination thereof.

In various embodiments, the present invention provides a textile coating, sunscreen, food coating, or plastic film including the UV-absorbent coating.

Zno Nanoparticles.

The UV-absorbent coating includes ZnO nanoparticles. The coating can include one type of ZnO nanoparticles, or multiple types of ZnO nanoparticles.

The ZnO nanoparticles can be in the form of aggregates in the UV-absorbent coating. The average squared distance from any point in the aggregates to their respective center of mass can be about 120 nm to about 250 nm, about 120 nm to about 180 nm, or about 120 nm or less, or less than, equal to, or greater than about 125 nm, 130, 135, 140, 145, 150, 155, 160, 165, 170, 175, 180, 185, 190, 195, 200, 205, 210, 215, 220, 225, 230, 235, 240, 245, or about 250 nm or more. The average number of ZnO particles in each aggregate can be about 50 to about 4,000, about 500 to about 2,500, or about 50 or less, or less than, equal to, or greater than about 100, 150, 200, 300, 400, 500, 600, 700, 800, 900, 1,000, 1,100, 1,200, 1,300, 1,400, 1,500, 1,600, 1,700, 1,800, 1,900, 2,000, 2,100, 2,200, 2,300, 2,400, 2,500, 2,750, 3,000, 3,250, 3,500, 3,750, or about 4,000 or more.

The ZnO nanoparticles can be any suitable ZnO nanoparticles. The can be modified ZnO nanoparticles, such as silane-modified ZnO nanoparticle. In some embodiments, the silane modification can allow for bonds to form between the silane groups on the ZnO nanoparticles and the binder during the drying (e.g., curing), while in other embodiments, no bonds form between the silane groups and the binder during the drying (e.g., no curing). The silane modification can be any suitable silane modification. For example, the ZnO nanoparticles can be modified by triethoxysilane, alkyltrioxysilane, pentyltriethoxysilane, aminopropyltriethoxysilane, or a combination thereof. In some embodiments, the ZnO nanoparticles can be free of surface modification.

The ZnO nanoparticles can have any suitable particle size (i.e., the largest dimension of the particle). The ZnO nanoparticles can have a particle size of about 1 nm to about 500 nm, about 20 nm to about 200 nm, about 10 nm to about 100 nm, about 20 nm to about 80 nm, or about 1 nm or less, or less than, equal to, or greater than about 5 nm, 10, 15, 20, 25, 30, 35, 40, 45, 50, 55, 60, 65, 70, 75, 80, 90, 100, 125, 150, 175, 200, 250, 300, 400 nm, or about 500 nm or more.

The ZnO nanoparticles can form any suitable proportion of the UV-absorbent coating, such as about 10 wt % to about 80 wt % of the coating, about 30 wt % to about 60 wt % of the coating, about 40 wt % to about 50 wt %, or about 10 wt % or less, or less than, equal to, or greater than about 12 wt %, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78 wt %, or about 80 wt % or more of the coating.

The UV-absorbent coating can have any relative concentration of the ZnO nanoparticles and the binder. For example, the UV-absorbent coating can have a weight ratio of the ZnO nanoparticles to the binder of about 0.001:1 to about 0.1:1, or about 0.001:1 or less, or less than, equal to, or greater than about 0.005:1, 0.01:1, 0.05:1, or about 0.1:1 or more.

Binder.

The UV-absorbent coating includes a binder including hydroxy($C_1$-$C_{10}$)alkyl cellulose. The binder can include one or more compounds that tether the ZnO nanoparticle aggregates together within the coating. The binder can form any suitable proportion of the coating, such as about 10 wt % to about 50 wt % of the coating, about 20 wt % to about 35 wt % of the coating, or about 10 wt % or less, or less than, equal to, or greater than about 12 wt %, 14, 16, 18, 20, 22, 24, 26, 28, 30, 32, 34, 36, 38, 40, 42, 44, 46, 48 wt %, or about 50 wt % or more of the coating. Any suitable proportion of the binder can be the hydroxy($C_1$-$C_{10}$)alkyl cellulose, such as about 60 wt % to about 100 wt %, 90 wt % to about 100 wt %, or about 60 wt % or less, or less than, equal to, or greater than about 65 wt %, 70, 75, 80, 85, 90, 95, 96, 97, 98, or about 99 wt % or more.

The hydroxy($C_1$-$C_{10}$)alkyl cellulose includes cellulose having about 1 mole % to about 100 mol % of hydroxy groups on the cellulose replaced with hydroxy($C_1$-$C_{10}$)alkyl-O— groups, or about 10 mole % to about 90 mole %, or about 40 mole % to about 60 mole %, or about 1 mole % or less, or less than, equal to, or greater than about 2 mole %, 4, 6, 8, 10, 15, 20, 25, 30, 35, 40, 41, 42, 43, 44, 45, 46, 47, 48, 49, 50, 51, 52, 53, 54, 55, 56, 57, 58, 59, 60, 65, 70, 75, 80, 85, 90, 95, 96, 97, 98 mole %, or about 99 mole % or more.

The hydroxy($C_1$-$C_{10}$)alkyl cellulose can be any suitable material that allows production of the UV-absorbent coating having the properties described herein. For example, the hydroxy($C_1$-$C_{10}$)alkyl cellulose can be hydroxy($C_1$-$C_3$)alkyl cellulose, or hydroxyethyl cellulose, or hydroxypropyl cellulose. The hydroxy($C_1$-$C_{10}$)alkyl cellulose can have any suitable molecular weight, such as a molecular weight of about 10,000 g/mol to about 5,000,000 g/mol, about 90,000 g/mol to about 1,300,000 g/mol, about 800,000 g/mol to about 2,500,000 g/mol, or about 10,000 g/mol or less, or less than, equal to, or greater than about 20,000 g/mol, 40,000, 60,000, 80,000, 100,000, 120,000, 140,000, 160,000, 180,000, 200,000, 250,000, 300,000, 350,000, 400,000, 450,000, 500,000, 550,000, 600,000, 650,000, 700,000, 750,000, 800,000, 850,000, 900,000, 950,000, 1,000,000, 1,050,000, 1,100,000, 1,150,000, 1,200,000, 1,250,000, 1,300,000, 1,400,000, 1,500,000, 1,600,000, 1,800,000, 2,000,000, 2,250,000, 2,500,000, 2,750,000, 3,000,000, 3,500,000, 4,000,000, or about 5,000,000 g/mol or more.

The binder can further include any suitable binder component in addition to the hydroxy($C_1$-$C_{10}$)alkyl cellulose. For example, the binder can further include hydroxy($C_1$-$C_{10}$)alkyl starch (e.g., hydroxy($C_1$-$C_3$)alkyl starch), hydroxyethyl starch, polylactide, keferin, benzophenone, a polymer, a polyurethane, an epoxy, an acrylic, or a combination thereof.

Dispersant.

The UV-absorbent coating, and the coating composition, includes a dispersant. The dispersant can include one or more surfactants that prevent the ZnO nanoparticles from aggregating together prior to their hierarchical self-assembly into the fractal structure that includes branch-like clusters including the ZnO nanoparticles that are bridged together with the binder. The dispersant can form any suitable proportion of the coating, such as about 10 wt % to about 50 wt % of the coating, about 20 wt % to about 35 wt %, or about 10 wt % or less, or less than, equal to, or greater than about 12 wt %, 14, 16, 18, 20, 22, 24, 26, 28, 28, 30, 32, 34, 36, 38, 40, 42, 44, 46, 48 wt %, or about 50 wt % or more.

The dispersant can include any one or more suitable surfactants. The dispersant can include PEG sorbitan fatty esters; PEG omega-3 fatty esters, ethers, and alcohols; glycerol fatty esters, sorbitan fatty esters. PEG glyceryl fatty esters, PEG fatty esters and alcohols, sugar fatty esters. PEG sugar esters, Tween 20, Tween 40, Tween 60, p-isononylphenoxypolyglycidol, PEG laurate, PEG oleate. PEG stearate, PEG glyceryl laurate, PEG glyceryl oleate, PEG glyceryl stearate, polyglyceryl laurate, plyglyceryl oleate, polyglyceryl myristate, polyglyceryl palmitate, polyglyceryl-6 laurate, plyglyceryl-6 oleate, polyglyceryl-6 myristate, polyglyceryl-6 palmitate, polyglyceryl-10 laurate, plyglyceryl-10 oleate, polyglyceryl-10 myristate, polyglyceryl-10 palmitate, PEG sorbitan monolaurate. PEG sorbitan monolaurate, PEG sorbitan monooleate. PEG sorbitan stearate, PEG oleyl ether, PEG laurayl ether, Tween 20, Tween 40. Tween 60. Tween 80, octoxynol, octoxynol-9, monoxynol, tyloxapol, sucrose monopalmitate, sucrose monolaurate, decanoyl-N-methylglucamide, n-decyl-p-D-glucopyranoside, n-decyl-β-D-maltopyranoside, n-dodecyl-β-D-glucopyranoside, n-dodecyl-β-D-maltoside, heptanoyl-N-methylglucamide, n-heptyl-β-D-glucopyranoside, n-heptyl-β-D-thioglucoside, n-hexyl-β-D-glucopyranoside, nonanoyl-N-methylglucamide, n-nonyl-β-D-glucopyranoside, octanoyl-N-methylglucamide, n-octyl-β-D-glucopyranoside, octyl-β-D-thioglucopyranoside and their derivatives; a polyphosphate such as sodium polyphosphate; or a combination thereof. In various embodiments, the dispersant can include sodium polyphosphate, polysorbate 20 (i.e., "Tween 20", a polysorbate-type nonionic surfactant formed by the ethoxylation of sorbitan before the addition of lauric acid), or a combination thereof.

Coating Composition.

Various embodiments of the present invention provide a coating composition which can be dried to form an embodiment of the coating described herein. The coating composition can include substantially the same components as the coating but can have a larger amount of water therein. The amount of water in the coating composition can be chosen such that the coating composition has an acceptable viscosity for facile application of a film of the coating composition that can be dried to form the coating.

The ZnO nanoparticles can form any suitable proportion of the coating composition, such as about 0.1 wt % to about 10 wt % of the coating composition, about 0.5 wt % to about 1 wt %, or about 0.1 wt % or less, or less than, equal to, or greater than about 0.2 wt %, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 2.2, 2.4, 2.6, 2.8, 3, 3.5, 4, 4.5, 5, 6, 7, 8, 9 wt %, or about 10 wt % or more of the coating composition.

The binder can form any suitable proportion of the coating composition, such as about 50 wt % to about 99.9 wt % of the coating composition, about 80 wt % to about 99.5 wt % of the coating composition, or about 50 wt % or less, or less than, equal to, or greater than about 52 wt %, 54, 56, 58, 60, 62, 64, 66, 68, 70, 72, 74, 76, 78, 80, 81, 82, 83, 84, 85, 86, 87, 88, 89, 90, 91, 92, 93, 94, 95, 96, 97, 98, 99 wt %, or about 99.5 wt % or more of the coating composition.

The dispersant can form any suitable proportion of the coating composition, such as about 0.01 wt % to about 30 wt % of the coating composition, about 0.1 wt % to about 20 wt %, or about 0.01 wt % or less, or less than, equal to, or greater than about 0.1 wt %, 0.5, 1, 2, 3, 4, 5, 6, 7, 8, 9, 10, 11, 12, 13, 14, 15, 16, 17, 18, 19, 20, 22, 24, 26, 28 wt %, or about 30 wt % or more.

Water can be any suitable proportion of the coating composition, so long as the proportion of water in the coating composition is greater than the proportion of water in the dried coating. Water can be from 5 wt % to about 99 wt % of the coating composition, or about 10 wt % to about 90 wt %, or about 20 wt % to about 80 wt %, or about 6 wt % or less, or less than equal to, or greater than about 7 wt %, 10, 15, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 85, 90, 95, or about 99 wt % or more of the coating composition. The amount of water in the coating composition can be selected such that the coating composition has an acceptable viscosity for formation of a film of the coating composition which can be dried to form the coating. The coating composition can have any suitable viscosity, such as measured with a Brookfield viscometer, such as about 20 cP to about 110 cP, or about 50 cP to about 80 cP, or about 20 cP or less, or less than, equal to, or greater than about 25 cP, 30, 35, 40, 45, 50, 52, 54, 56, 58, 60, 62, 64, 66, 68, 70, 72, 74, 76, 78, 80, 85, 90, 95, 100, 105 cP, or about 110 cP or more.

The coating composition can be formed from and can include a dispersion including the ZnO nanoparticles and the dispersant in a suitable solvent (e.g., water), wherein the dispersant forms a suitable proportion of the dispersion, such as about 0.01 wt % to about 5 wt % of the dispersion, about 0.1 wt % to about 1.5 wt % of the dispersion, about 0.01 wt % or less, or less than, equal to, or greater than about 0.05 wt %, 0.1, 0.2, 0.3, 0.4, 0.5, 0.6, 0.7, 0.8, 0.9, 1, 1.1, 1.2, 1.3, 1.4, 1.5, 1.6, 1.8, 2, 2.2, 2.4, 2.6, 2.8, 3, 3.2, 3.4, 3.6, 3.8.4, 4.2, 4.4, 4.6, 4.8 wt %, or about 5 wt % or more.

Method of Making a UV-Absorbing Coating.

Various embodiments of the present invention provide a method of making an embodiment of the UV-absorbing coating described herein. The method can include applying a coating composition to a substrate, the coating composition including the binder, the ZnO nanoparticles, the dispersant, and water. The method can further include drying the applied coating composition, to form the UV-absorbent coating. The drying can include curing the applied coating composition, or the drying can be free of curing.

The method can include combining a solution (e.g., aqueous solution) including the binder with a solution (e.g., aqueous solution) including the ZnO nanoparticles and the dispersant, to form the coating composition. The method can further include sonicating or stirring the solution including the binder, the solution including the ZnO nanoparticles and the dispersant, or both, prior to combining the solutions to form the coating composition. The method can further include heating the solution including the binder, the solution including the ZnO nanoparticles and the dispersant, or both, prior to combining the solutions to form the coating composition. In some embodiments, the method can be free of heating the dispersant or the ZnO. The method can further including sonicating, stirring, or heating the coating composition, or a combination thereof, prior to applying the coating composition to the substrate. Prior to combining the solutions, the method can include adjusting the pH of the solution including the binder to about 8-10 or about 8-9, such as using a suitable amount of ammonium hydroxide, sodium hydroxide, potassium hydroxide, a combination thereof, or one or more other suitable bases. Drying can include curing, such that chemical bonds are formed, or drying can be free of curing. Drying can include drying under ambient conditions, or can include drying with the addition of heat, vacuum, or a combination thereof.

EXAMPLES

Various embodiments of the present invention can be better understood by reference to the following Examples which are offered by way of illustration. The present invention is not limited to the Examples given herein. In this section, when the weight percent of various components of the coating are described, the weight percent corresponds to the weight percent of the component in the coating composition (e.g., the wet, undried coating), unless otherwise indicated.

Materials. Zinc oxide dispersion (<100 nm. Aldrich Product #721077, ZnO particles were silane-modified), silane-modified zinc oxide nanopowder (<50 nm, >97%, Aldrich Product #677450), titanium dioxide (~21 nm, Aldrich Product #718467), hydroxyethyl starch (>1,000,000 g/mol, Aldrich), hydroxyethyl cellulose (Aldrich), hydroxyethyl cellulose (1,300,000 g/mol, Aldrich), Tween 20 (1288 g/mol. Aldrich). Na polyphosphate (>68%. Aldrich), ammonium hydroxide (28-30%. Fischer).

Materials Characterization. Scanning electron microscope micrographs were taken via a field-emission scanning electron microscope (Nanonova 230. FEI, USA). The UV-blocking capability and transparency were assessed via the use of a UV-Vis spectrometer (Cary 5000-Vis-NIR. Agilent. USA). Laser light diffraction was measured with a dynamic light scattering (Zetasizer NanoZS, Malvern, USA). X-ray diffraction studies were taken on a small angle x-ray scattering diffractometer (Xeuss 2.0 SWAXS, XENOCS, France), with analysis conducted using SASView computational software.

SEM Imaging. A Verios XHR SEM (FEI) was used for electron microscopy characterization. The microscope was operated at 5-10 kV with the ET detector. Bright field and secondary electron images were simultaneously recorded. The samples were prepared by sputtering a thin layer of gold on the film surface to eliminate charging of the nonconductive surface.

UV-Vis Spectroscopy. A Cary 5000 UV-Vis-NIR was used to assess UV absorption and transparency of the coatings. The specimens were measured from 200-700 nm in transmission mode with air as the baseline. The specified UVA absorption was taken at 354 nm, and the transparency was taken as the median of the visible spectrum at 600 nm.

Dynamic Light Scattering. A Malvern Panalytical Zetasizer Nano ZS was used to estimate the size of nanoparticles in the powders and dispersions. Samples were prepared with diluted, aqueous solutions of nanoparticles and the mixtures were stirred and sonicated prior to characterization.

Small-angle X-ray scattering (SAXS): Small-angle X-ray scattering measurements were conducted on a XENOCS Xeuss 2.0 SWAXS system with monochromatized X-ray using Cu Kα radiation with the wavelength λ=1.5406 Å. Data were collected by Pilatus 1M detector at the sample-to-detector distance of 5117 mm calibrated by the silver behenate standard. The corresponding scattering vector (q) window is 0.003-0.1 Å-1. A typical acquisition time for the specimen is 1200 s. The measurement is conducted via the elastic scattering of Cu Kα x-rays at a fixed wavelength and small angle. For systematic simplicity, only the commercial ZnO dispersion was analyzed. The ZnO was dispersed in three binders with varying viscosities and morphologies: HES (>1,000,000 g/mol) and HEC (90,000 g/mol and 1,300,000 g/mol). The spectrum produced by the SASView program plots one curve for each binder formulation, and viscosity differences are accounted for in varying binder concentration in the composite. The curves are plotted as a function of intensity and q, which is the interparticle distance. Two scaling regimes are present in these curves: low and high q regions. The low q region is representative of the fractal components of the structure, and the slope variation via the power law leads to higher values of q, which represent larger, hierarchical aggregates. By establishing the relationship between low and high q regions, various characteristic values can be calculated. First, is the Guinier radius of the fractal, which can be described as the average squared distance from any point in the aggregate to its center of mass. The Guinier radius can be calculated according to the Equation 1.

$$R_{g,f} = \sqrt{\frac{D(D+1)\xi^2}{2}} \quad \text{(Equation 1)}$$

D is fractal dimension and $\xi$ is the correlation length of the fractal. The G aggregation number, which is the average number of particles in an aggregate, can also be calculated based on the information derived from SAXS output data. G aggregation number can be calculated according to Equation 2.

$$G = \Gamma(D+1)\left(\frac{\xi}{R}\right)^D \quad \text{(Equation 2)}$$

where G is aggregation number, $\Gamma$ is the gamma function. R is particle radius, $\xi$ is correlation length of the fractal and D is fractal dimension. The data obtained from Equation 1 and Equation 2 were calculated with fixed particle size.

Viscometry. The Brookfield Viscometer was used to calculate the rheology of the formulation. The #2 spindle was used across a range of rotational speeds from 20-100 RPM.

Example 1. Synthesis of Coating

In a glass vial, modified starch/cellulose (1.2 g) was diluted to 4 wt. %. The mixture was stirred at 550 RPM for 2 minutes, modified with ammonium hydroxide (to pH 9), and stirred once more for 5 minutes. The solution was then heated under microwave irradiation. Following, a separate mixture of ZnO (0.24 g). Na polyphosphate (0.006 g), and deionized water (0.95 mL) was stirred and sonicated for 5 minutes. The solution was diluted with deionized water (3 mL), stirred 5 additional minutes, and then homogenized for 5 minutes. A commercial ZnO dispersion can replace the previous, with Tween 20 (0.075 g) as the dispersant and an additional 20 minutes of sonication in place of the homogenization step. The binder solution and nanoparticle dispersions were combined at 550 RPM for 10 minutes. In the case of the nanopowder dispersion, the mixture was homogenized for 5 minutes, whereas with the commercial dispersion, the mixture was sonicated for 20 minutes. After thorough homogeneity has been achieved, the formulation was drawn down on corona-treated polyethylene plastic with a stainless-steel drawdown bar of 75 μm wet thickness. The film was dried at room temperature in open air for about 10 to 20 minutes. The dried 2-hydroxyethyl starch film had 75 wt % binder, 15 wt % ZnO nanoparticles, and 10% dispersant. The dried 2-hydroxyethyl cellulose film had 28 wt % binder, 44 wt % ZnO nanoparticles, and 28 wt % dispersant.

Example 2. Characterization and Analysis of Results

The results show that without fully dispersing ZnO nanoparticles, high UV blocking efficacy can still be achieved through specific aggregation patterns of ZnO nanoparticles. Furthermore, it was demonstrated that choice of biobased, polymeric binder has a profound impact in the formation of hierarchical, self-assembly structures of nanoparticles in a thin coating film. Two widely used biobased polymer derivatives were studied here: 2-hydroxyethyl starch (HES) and 2-hydroxyethyl cellulose (HEC). These two polymers have almost identical chemical compositions. The only difference is the glycosidic linkage connecting the saccharide units. In starch, all the glucose units are oriented in the same direction, which results in a coil like structure in solution. However, in cellulose, each glucose unit is rotated 180° around the axis of the polymer backbone, relative to the previous repeat unit, leading to a rod like structure in solution. The present results clearly indicate that the small difference in binder polymers resulted in drastic difference in the UV blocking performance of the coating films.

The aforementioned discovery is significant for fabrication of nanocomposites that require high nanoparticle concentration. This is especially relevant for applications with constrained space, such as a thin layer of coating film, where aggregations can hardly be avoided. Indeed, using the formulation including ZnO nanoparticles and HEC, ultra-thin coating films (0.2 μm-2 μm) can be obtained without sacrificing the UV-blocking performance, while many systems with comparable UV blocking performance reported in literature are much thicker (>50 μm). Table 1 briefly lists some of the results from previous studies, together with the results in the present. It is obvious that the inventive coating film is much thinner, and the use of ZnO nanoparticles is among the most efficient in terms of the UV blocking efficacy. In order to accurately measure such a thin film thickness, the coating film cross-section was examined under a high-resolution scanning electron microscope (SEM), as shown in FIGS. 1(a)-(b). FIG. 1(a) illustrates a SEM micrograph of coating thickness on PET plastic, with 90,000 g/mol HEC with ZnO dispersion and Tween 20. FIG. 1(b) illustrates a SEM micrograph of coating thickness on PET plastic, with 1,300,000 g/mol HEC with ZnO dispersion and Tween 20. The lower dosage and heightened viscosity of 1,300,000 g/mol HEC creates diffusion problems in the coating, enhancing the number of aggregates on or near the coating surface. The scale bar is 4 μm. Table 1 shows a comparison of the qualities of ZnO thin films. The 1 μm film shows comparable UV absorbance, transparency, and ZnO content at a much lower thickness. Representative values of 354 and 600 nm were selected from the UVA and visible ranges, respectively, for comparative measures. Values of transmittance are calculated from extrapolated absorbance values. [1] J. Miklečić, S. Blagojević, M. Petrič, V. Jirouš-Rajković *Prog. Org. Coat.* 2015, 89, 67. [2] T. Nguyen, P. Dao, K. Duong. Q. Duong, Q. Vu. A. Nguyen, V. Mac, T. Le *Prog. Org. Coat.*, 2017, 110, 114. [3] A. Babei-Ghazvini I. Shahabi-Ghahfarrokhi, V. Goudarzi *Food Pack, and Shelf Life,* 2018, 16, 103. [4] S. Therias, J. Larché, P. Bussière. J. Gardette, M. Murariu, P. Dubois *Biomacromolecules,* 2012, 13, 3283. [5] M. Lowry. D. Hubble, A. Wressell, M. Vratsanos, F. Pepe, C. Hegedus *J. Coat. Technol.* 2008, 5, 233.

TABLE 1

Comparison of the qualities of various ZnO thin films. ZnO content of the undried coating composition is given, with thickness and transmittance given for the dried coating.

| Binder choice (with ZnO nanoparticles) | ZnO Content in Formulation | Thickness (μm) | Transmittance | |
|---|---|---|---|---|
| | | | UVA (354 nm) | Visible (600 nm) |
| This study: HEC | 0.8% | 0.2 - 2.5 | 5% | 65% |
| Neat resin[1] | 2% | 40 | 8% | 80% |
| Acrylic emulsion[2] | 2% | 45 | 15% | 57% |
| Starch + keferin[3] | 1% | 130 | 2%* | 79%* |
| Polylactide[4] | 1% | 140 | 6%* | 79%* |
| Polyurethane/acrylic polymer resin[5] | 2% | 2000 | 7% | 85% |

The present coating formulation has three key elements: the UV-blocking agent, polymeric binder, and chemical dispersant. A variety of UV-blocking nanoparticles were explored in the scope of the experiment, including $TiO_2$ nanopowders (~21 nm), ZnO nanopowders (~50 nm), and pre-dispersed ZnO nanoparticles (~30 nm). The unique band gap of wurtzite ZnO promotes UV blocking in the UVA range, which has been proven to be the most vital portion of the spectrum in the promotion of food degradation. There are two major reasons to choose small ZnO nanoparticles (FIGS. 2(a)-(b)). FIG. 2(a) illustrates a TEM micrograph of a ZnO commercial dispersion at low magnification with a 100 nm scale bar. FIG. 2(b) illustrates a TEM micrograph of a ZnO commercial dispersion at high magnification with a 20 nm scale bar. First, under the same volume nanoparticles have much larger surface area compared with micron size particles, which will enhance the UV absorbing efficiency. Second, nanoparticles are much smaller than the wavelength of the visible light, so that the scattering of visible light is minimized, and nanocomposite can maintain the transparency. However, when coating film dries, limited space forces the crowding of nanoparticles that inevitably induces interparticle aggregation. The aggregation has two effects: 1) decreases the nanoparticle surfaces available for absorbing the UV radiation; 2) large aggregates scatter more visible light and deteriorate the transparency. Hence, a small amount of chemical dispersant was added to disperse nanoparticles and prevent the formation of large aggregates. In the present study, a sodium polyphosphate dispersant was used for nanopowders such as ZnO and $TiO_2$. For the ZnO nanoparticle dispersion, since the nanoparticle surface was already modified with silane and dispersible in water, a small amount of Tween 20 (0.5 wt %) was added to help further improve the dispersion of ZnO nanoparticles in solution.

However, dispersant alone cannot control aggregation of ZnO nanoparticles and achieve the high UV blocking efficacy. One critical component of the nanocomposite is the polymeric binder, which may be most influential factor in determining the aggregation formation and coating performance.

Figure 3:
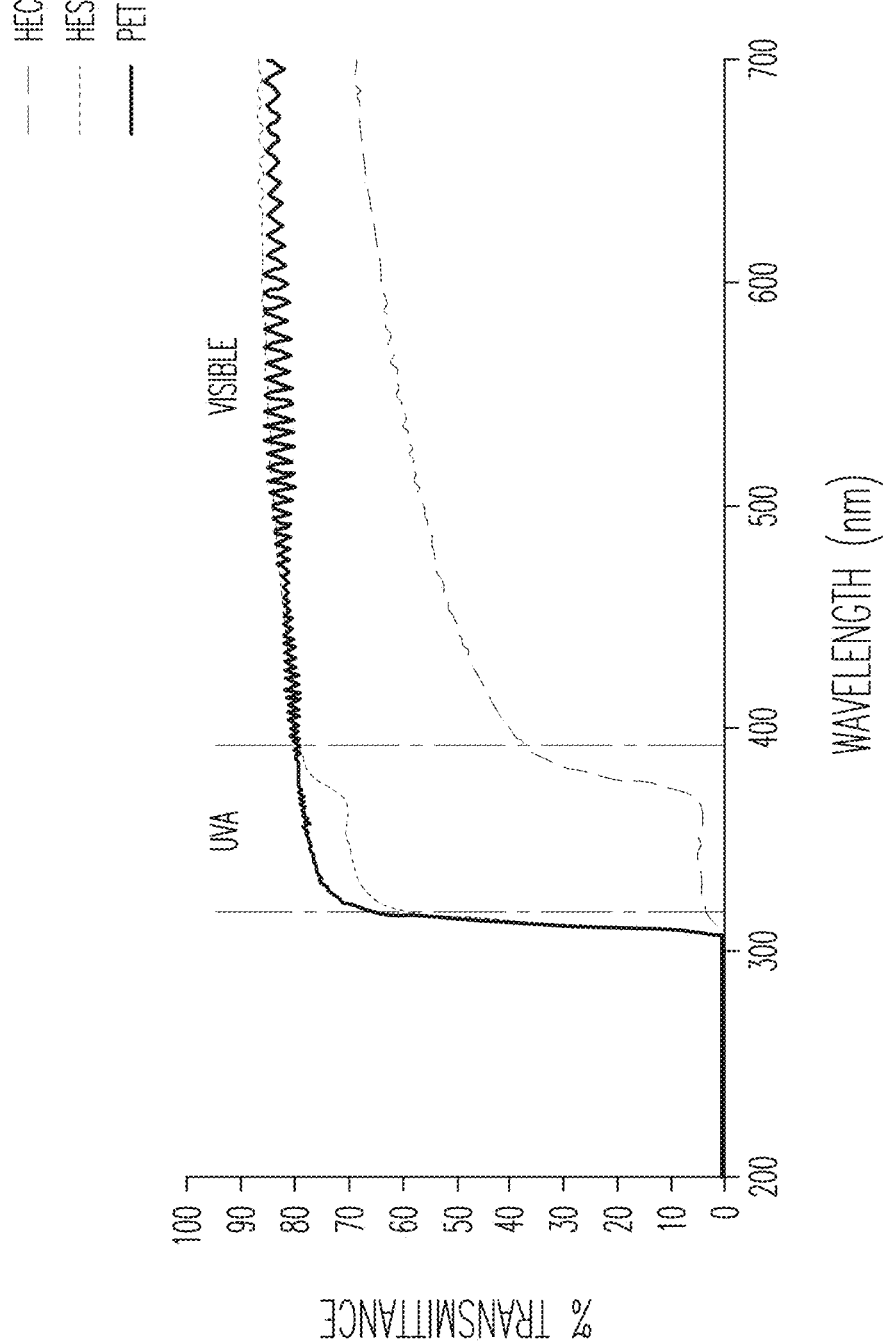
FIG. 3 illustrates an ultraviolet-visible (UV Vis) spectrum for the PET substrate alone, and HEC and hydroxyethyl starch (HES) with ZnO nanocrystals and Tween 20, in accordance with various embodiments.

When formulated with HEC and ZnO nanoparticles, the final coating film showed high transparency at the visible wavelength range (~70%) and UV blocking efficiency (>90%) as shown in FIG. 3. FIG. 3 illustrates a UV Vis spectrum for the PET substrate alone, and HEC and HES with ZnO nanocrystals and Tween 20. HEC greatly outperformed HES due to the rigidity of its trans backbone. Interestingly, when loaded with the same amount of ZnO nanoparticles with HES, the coating film lost almost all the UV-blocking capabilities. Since HEC and HES have almost identical chemical compositions, the results are rather unexpected. One possible explanation is linked to the differences in the conformations of HEC and HES molecules. In starch, the glucose units are connected through a cis (a) glycosidic bond, while in cellulose, the bond is trans (3). The difference in bond orientation drastically changes the morphology of the whole polymer chains in aqueous solution. In aqueous solutions, HEC behaves as rigid and extended chain, whereas that aqueous solutions of amylose (precursor of HES) cannot have extended helical, rod like structures. Persistence length is usually used to measure the polymer chain stiffness. When persistence is comparable or even longer than the polymer chain length, polymer will behave as stiff rigid rods. Otherwise, polymers are flexible and forms coil-like structures. Prior studies of modified starch and its derivatives indicate HES has a significantly shorter persistence length of ~6 nm, compared to HEC whose persistence length is ~40 nm. It is obvious that HES adopts a more globule-like conformation while HEC adopts a more extended rod like conformation. The compact structure of HES in aqueous solution also limits its capability to thicken the formulation. HEC is a much more efficient thickener than HES with the similar molecular weight.

Figure 4:
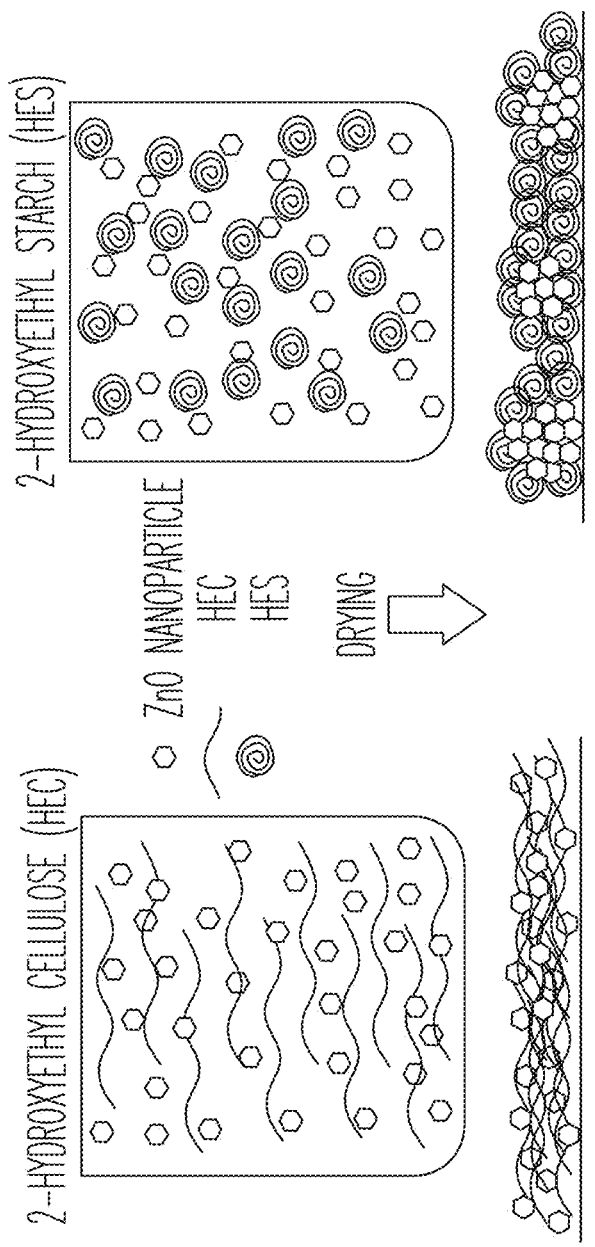
FIG. 4 illustrates aggregation patterns of zinc oxide nanocrystals with polymeric binders hydroxyethyl starch and hydroxyethyl cellulose before and after drying into a nanocomposite, in accordance with various embodiments.
Figure 5B:
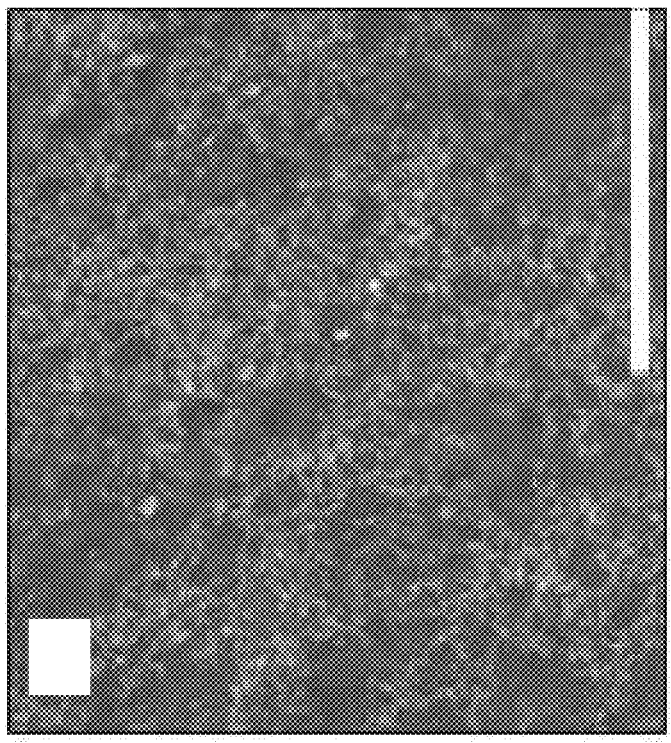
FIG. 5(b) illustrates SEM micrographs of the aggregation patterns formed by the ZnO nanoparticles with binder polymer HEC, in accordance with various embodiments.
Figure 5A:
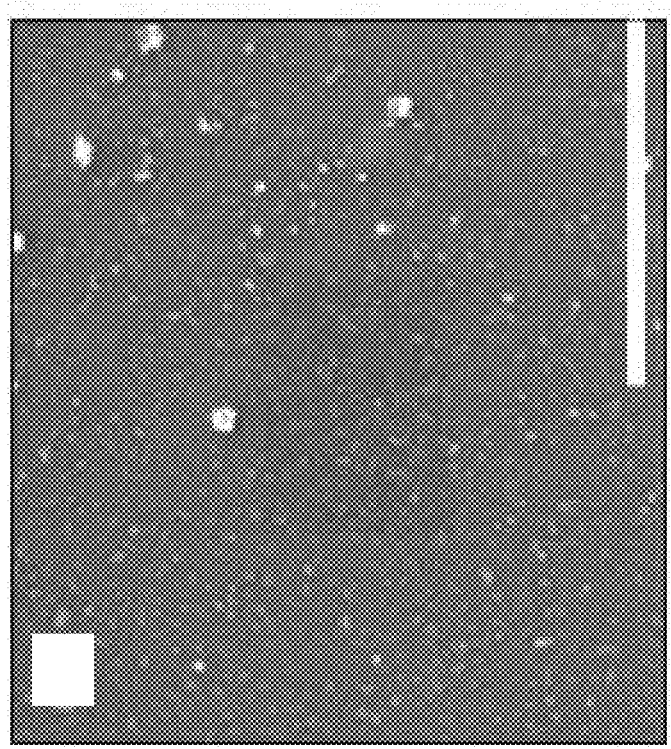
FIG. 5(a) illustrates SEM micrographs of the aggregation patterns formed by the ZnO nanoparticles with binder polymer HES, in accordance with various embodiments.

In order to understand the dramatic UV-blocking performance between HEC and HES, the details of distribution and aggregation of ZnO nanoparticles were examined under SEM, as shown in FIG. 4. FIG. 4 illustrates aggregation patterns of zinc oxide nanocrystals with polymeric binders hydroxyethyl starch and hydroxyethyl cellulose before and after drying into a nanocomposite. Interestingly, HEC and HES coating films showed completely different ZnO nanoparticles aggregation structures. FIG. 5(a) illustrates SEM micrographs of the aggregation patterns formed by the ZnO nanoparticles with binder polymer HES. FIG. 5(b) illustrates SEM micrographs of the aggregation patterns formed by the ZnO nanoparticles with binder polymer HEC. Scale bar is 5 μm. In FIG. 5(a). ZnO nanoparticles aggregated into individual clusters when HES was used as the binder polymer. These kinds of aggregates have been often observed for nanocomposite materials. However, in FIG. 5(b), ZnO nanoparticles form intriguing fractal network structures when HEC was used as the polymeric binder. The structures showed great resemblance with the branched structures formed by diffusion limited aggregation (DLA), which suggested that strong attractions exist among nanoparticles when the coating films dry out. Since all the other conditions for these two coating formulations were kept the same, different ZnO nanoparticle aggregation structures are likely due to the differences between HEC and HES.

The comparison between HEC and HES suggests that the molecular architecture of polymer backbone has profound effects upon the particle aggregation within the nanocomposite. It is hypothesized that the extended rod like structures of HEC may induce strong attractions among ZnO nanoparticles during the drying process of the coating film. Two possible mechanisms should be considered. When volume shrinks as coating film dries, HEC polymers may form bridges among ZnO nanoparticles and induce strong attractions among nanoparticles. Since HEC is has an extended conformation with high persistent length, the bridging may happen more efficiently and at much longer distance than HES. Another potential mechanism for strong attraction is the depletion force, which depends on many different factors including the polymer dimension and nanoparticle size. Many factors may influence this interaction; however, it is known that larger polymer dimensions may induce stronger and longer range attraction among nanoparticles. In this scenario, HEC again may induce stronger attraction at larger distance among ZnO nanoparticles.

Schematic plots of HEC and HES conformations in aqueous solutions together with the ZnO nanoparticles are depicted in FIG. 4. The assembly structures of ZnO nanoparticles are one way to differentiate the UV-blocking capabilities of the present coating films. It further demonstrates the possible aggregation structures when the coating films are dried. When HES is used as binder polymers, the polymer coils initiate the formation of dense aggregates composed of many particles. Therefore, the contact of UV light with nanoparticle surface is drastically limited by aggregation since aggregation drastically reduced the exposed ZnO surface area. In comparison, the loose, branch-like clusters formed under HEC are extended particle by particle, exposing large amount nanoparticle surface for interacting with UV. At the same time, the HEC composite is largely transparent also owing thanks again to the open fractal structures.

Figure 6A:
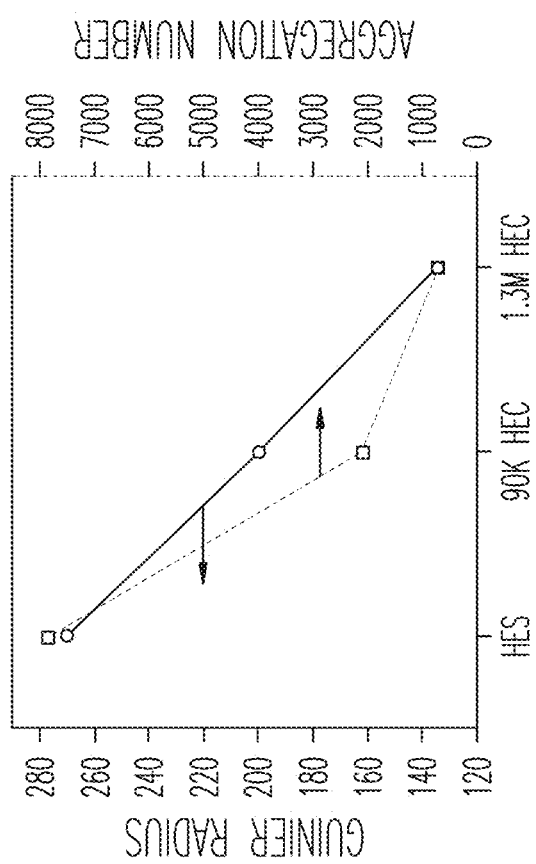
FIG. 6(a) illustrates Guinier radius and G aggregation number of polymeric binders with commercial ZnO dispersions, in accordance with various embodiments.
Figure 6B:
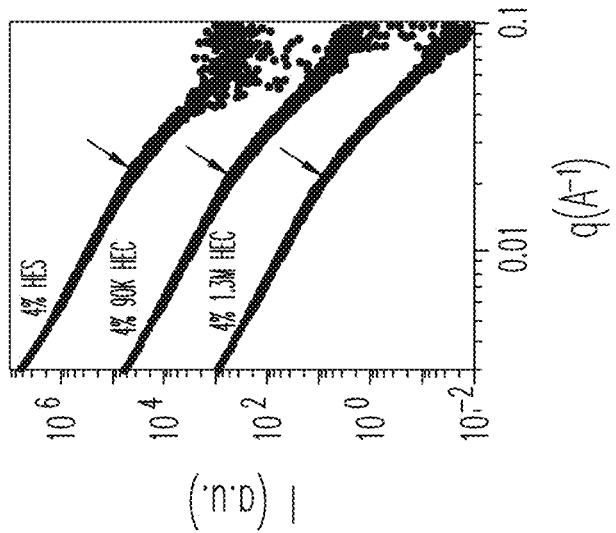
FIG. 6(b) illustrates fitted curves of polymeric binders with ZnO dispersions, in accordance with various embodiments.
Figure 7B:
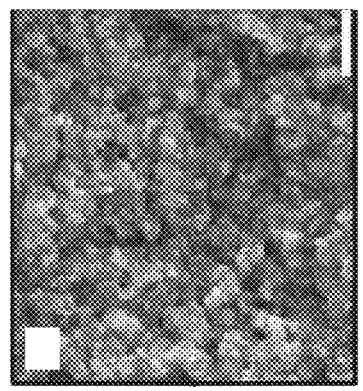
FIG. 7(b) illustrates a SEM micrograph of 0.5% Na polyphosphate, with small homogenously distributed aggregates, in accordance with various embodiments.
Figure 7C:
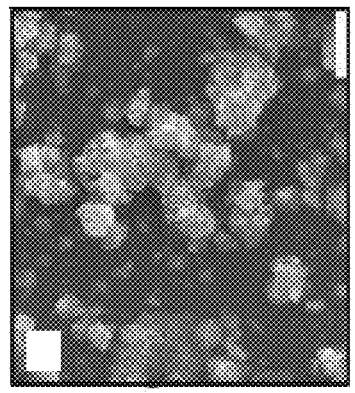
FIG. 7(c) illustrates a SEM micrograph of 2% Na polyphosphate, with large heterogeneous clusters, in accordance with various embodiments.
Figure 7A:
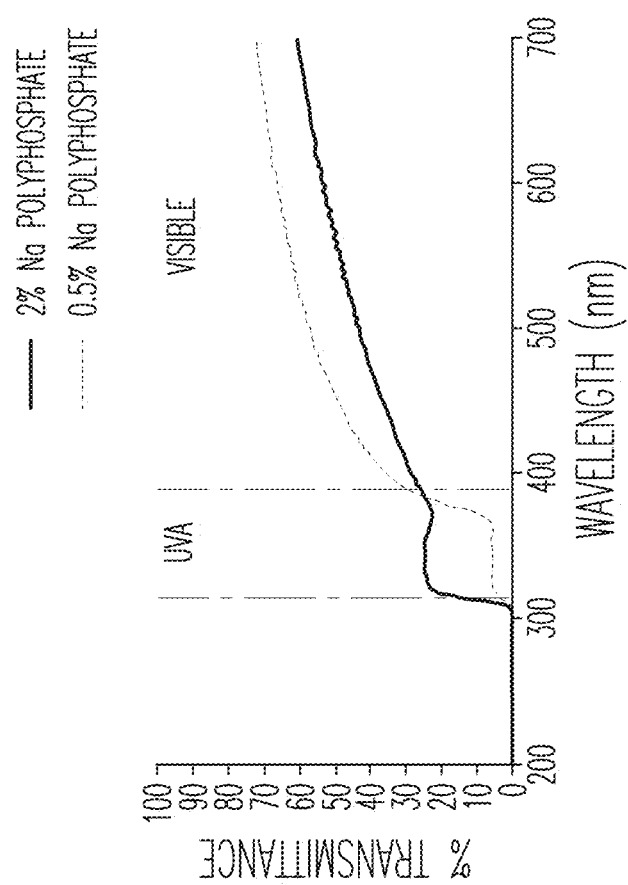
FIG. 7(a) illustrates a UV-Vis spectrum of varying concentrations of Na Polyphosphate with 4% ZnO nanopowders, in accordance with various embodiments.

To gain a deeper understanding of aggregate size and cluster dispersivity in the nanocomposite, small angle x-ray scattering measurements were conducted. First ZnO nanoparticle size is fixed at 30 nm, which was verified via SEM analysis. FIG. 6(a) illustrates Guinier radius and G aggregation number of polymeric binders with commercial ZnO dispersions. FIG. 6(b) illustrates a comparative plot showing fitted curves of polymeric binders with commercial ZnO dispersions, with the vertical axis indicating the intensity of scattering, and with the horizontal axis indicating the q number, which explains the nature of the aggregates that form, with low q exemplifying fractal structure formation and interparticle distance. The shoulders in FIG. 6(b) represent a morphological change in the structures which form. The heightened slope and shoulder placement in HES yields a higher aggregation number and aggregate radius, at the expense of the polymeric structure and resulted flexibility of modified starch. FIGS. 6(a)-(b) elucidate a great amount of information which provides verification for SEM results and differentiation between nanocomposite samples. FIG. 7(a) illustrates a UV-Vis spectrum of varying concentrations of Na Polyphosphate with 4% ZnO nanopowders. FIG. 7(b) illustrates a SEM micrograph of 0.5% Na Polyphosphate, with small homogenously distributed aggregates. FIG. 7(c) illustrates a SEM micrograph of 2% Na Polyphosphate, with large heterogeneous clusters. The scale bar is 1 μm. FIG. 6(a) shows a heightened value of Guinier radius and G aggregation number, which suggests that HES forms much denser aggregates with larger diameters when compared to HEC. This can be visualized in the steeper slope and shifted shoulder of the HES spectrum in FIG. 6(b). The enhanced aggregate radius and density of 90,000 g/mol HEC in comparison to 1,300,000 g/mol HEC may be due to the stronger attraction among ZnO nanoparticles induced by the higher molecular weight or larger dimension of binder polymers.

Figure 8A:
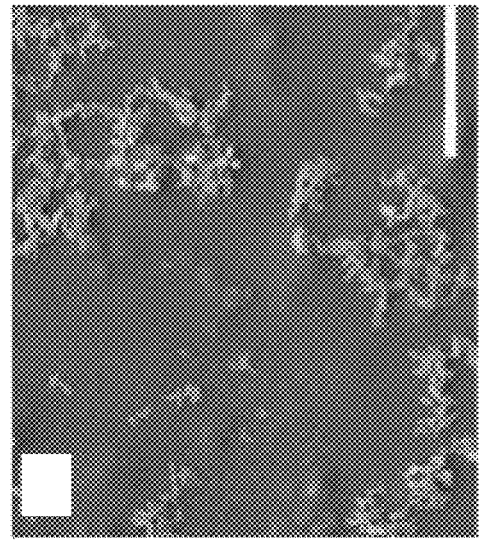
FIG. 8(a) illustrates a SEM micrograph of fractal aggregates formed by 90,000 g/mol HEC and chemical dispersant with ZnO nanopowder, in accordance with various embodiments.
Figure 8B:
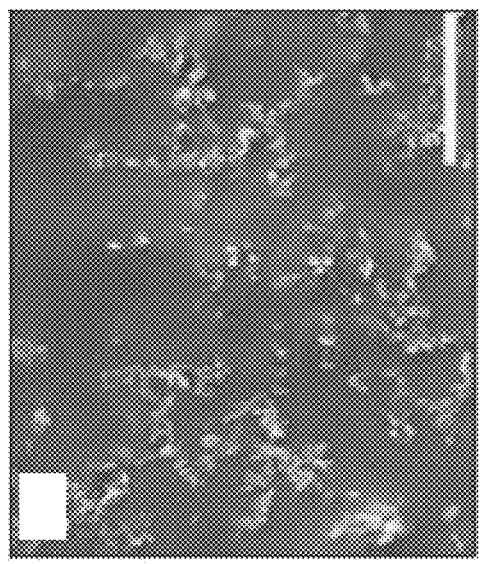
FIG. 8(b) illustrates a SEM micrograph of fractal aggregates formed by 90,000 g/mol HEC and chemical dispersant with ZnO dispersion, in accordance with various embodiments.
Figure 8C:
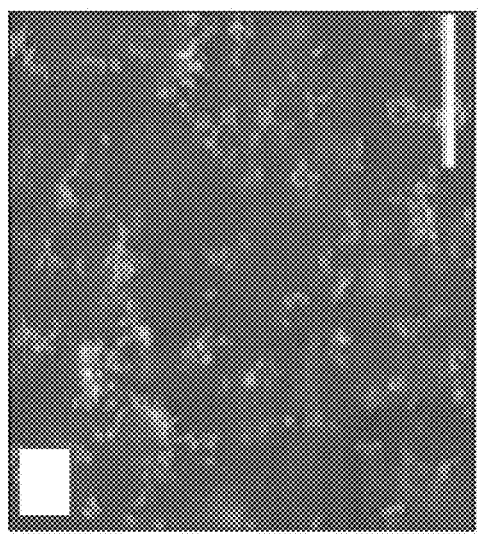
FIG. 8(c) illustrates a SEM micrograph of fractal aggregates formed by 90,000 g/mol HEC and chemical dispersant with $TiO_2$ nanopowder, in accordance with various embodiments.
Figure 9C:
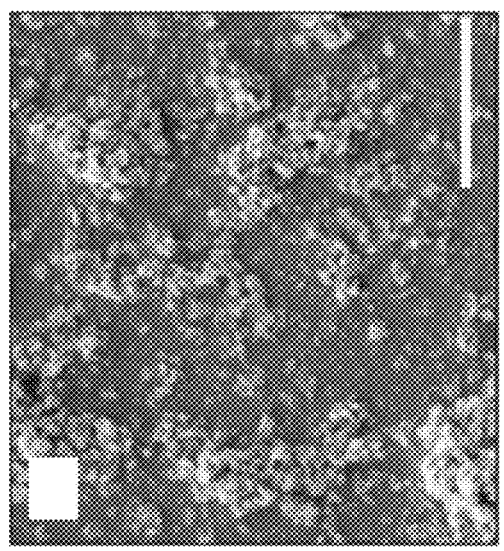
FIG. 9(c) illustrates a SEM image of the aggregates formed by 1,300,000 g/mol HEC and chemical dispersant with $TiO_2$ nanopowder, in accordance with various embodiments.
Figure 9B:
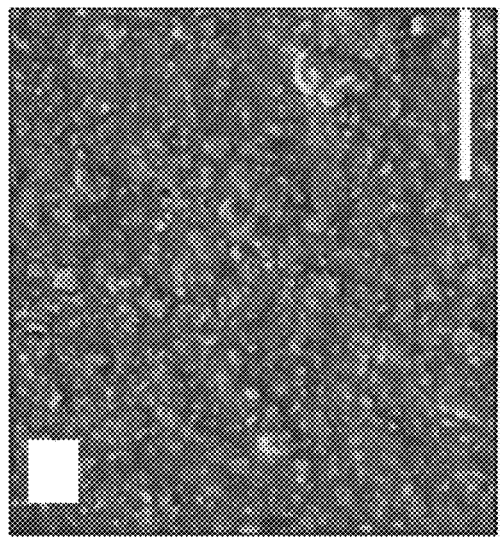
FIG. 9(b) illustrates a SEM image of the aggregates formed by 1,300,000 g/mol HEC and chemical dispersant with ZnO dispersion, in accordance with various embodiments.
Figure 9A:
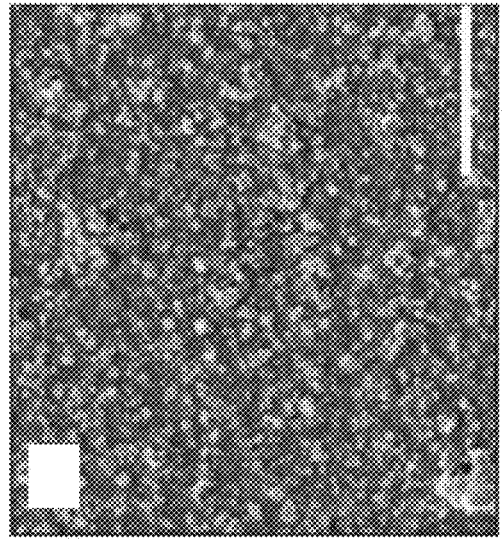
FIG. 9(a) illustrates a SEM image of the aggregates formed by 1,300,000 g/mol HEC and chemical dispersant with ZnO nanopowder, in accordance with various embodiments.
Figure 10C:
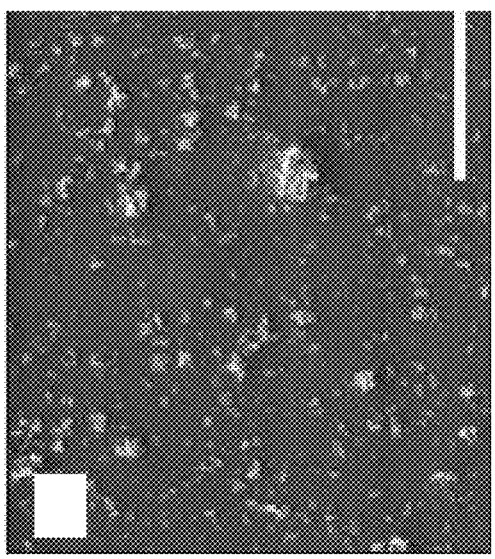
FIG. 10(c) illustrates a SEM image of 1,00,000 g/mol HES and chemical dispersant with $TiO_2$ nanopowder, in accordance with various embodiments.
Figure 10B:
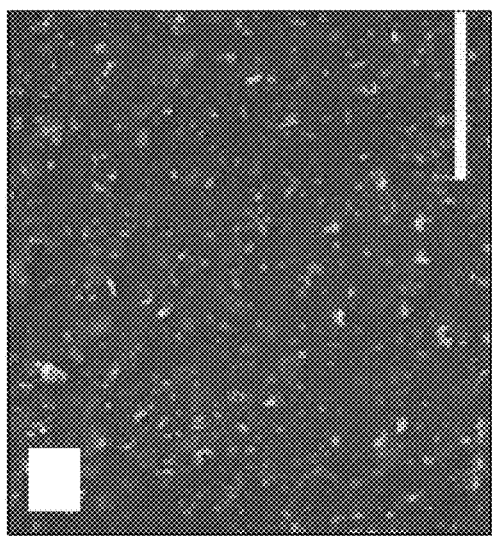
FIG. 10(b) illustrates a SEM image of 1,00,000 g/mol HES and chemical dispersant with ZnO dispersion, in accordance with various embodiments.
Figure 10A:
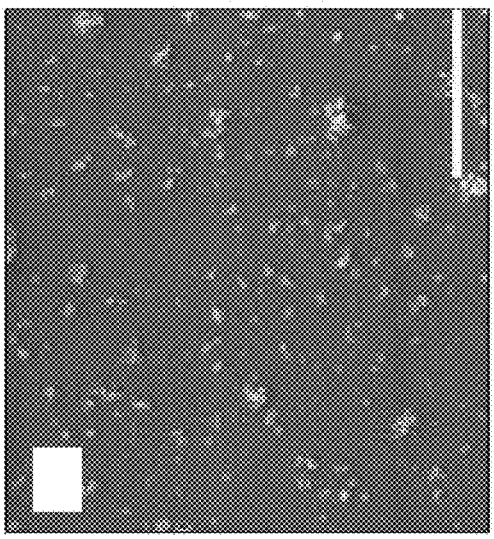
FIG. 10(a) illustrates a SEM image of 1,00,000 g/mol HES and chemical dispersant with (a) ZnO nanopowder, in accordance with various embodiments.

The capabilities of the aforementioned nanocomposite are dependent upon more than just the polymeric binder; the loading of chemical dispersant has also been observed to vary nanoparticle aggregation and composite effectiveness. The presence of a dispersing agent is important in improving the UV-blocking coatings, and sodium polyphosphate was observed to be highly effective in the dispersion of various nanopowders including ZnO and $TiO_2$ (FIGS. 8(a)-(c). FIGS. 9(a)-(c), and FIGS. 10(a)-(c)). FIG. 8(a) illustrates a SEM micrograph of fractal aggregates formed by 90,000 g/mol HEC and chemical dispersant with ZnO nanopowder. FIG. 8(b) illustrates a SEM micrograph of fractal aggregates formed by 90,000 g/mol HEC and chemical dispersant with ZnO dispersion. FIG. 8(c) illustrates a SEM micrograph of fractal aggregates formed by 90,000 g/mol HEC and chemical dispersant with $TiO_2$ nanopowder. The scale bar is 5 microns. FIG. 9(a) illustrates a SEM image of the aggregates formed by 1,300,000 g/mol HEC and chemical dispersant with ZnO nanopowder. FIG. 9(b) illustrates a SEM image of the aggregates formed by 1,300,000 g/mol HEC and chemical dispersant with ZnO dispersion. FIG. 9(c) illustrates a SEM image of the aggregates formed by 1,300,000 g/mol HEC and chemical dispersant with $TiO_2$ nanopowder. The concentration of ZnO in this system is eight times higher than that depicted in 90,000 g/mol HEC as a means of matching viscosity for ease of processing. The scale bar is 5 plm. FIG. 10(a) illustrates a SEM image of 1,00,000 g/mol HES and chemical dispersant with (a) ZnO nanopowder. FIG. 10(b) illustrates a SEM image of 1,00,000 g/mol HES and chemical dispersant with ZnO dispersion. FIG. 10(c) illustrates a SEM image of 1,00,000 g/mol HES and chemical dispersant with $TiO_2$ nanopowder. The scale bar is 5 μm. With the addition of the chemical dispersant, improved size distribution and UV blocking were observed, and it has become clear that the level of loading can drastically alter performance. It has been shown that large, dense aggregates in the composite impact light scattering and widespread UV-blocking, and variation in cluster size has been observed with changing sodium polyphosphate concentration. It was observed that as the concentration of sodium polyphosphate is increased, the surfaces of the nanoparticles become coated and the dispersing power is enhanced. However, if the concentration increases above the specified threshold, micelles form in solution which entrap the particles in large, densely packed aggregates. The optimal condition for homogenous dispersivity of particles is 0.5 wt % of polyphosphate within the nanopowder dispersion. As the concentration of dispersant reaches 2 wt % in the dispersion formula, the formation of clusters becomes apparent, impacting the scattering behavior of the composite.

Following previous discussion, the formation of large, dense aggregates reduces the regularity of the composite, therefore large concentrations of polyphosphate show reduced UV performance when compared to lesser concentrations (FIG. 10(a)). Smaller clusters not only show enhanced UV blocking capabilities, but also a heightened transparency at the expense of the structure and the resulted scattering patterns. SEM data explicitly verifies the previous and establishes ties between film structure and capabilities (FIGS. 10(b) and 10(c)).

Figure 11:
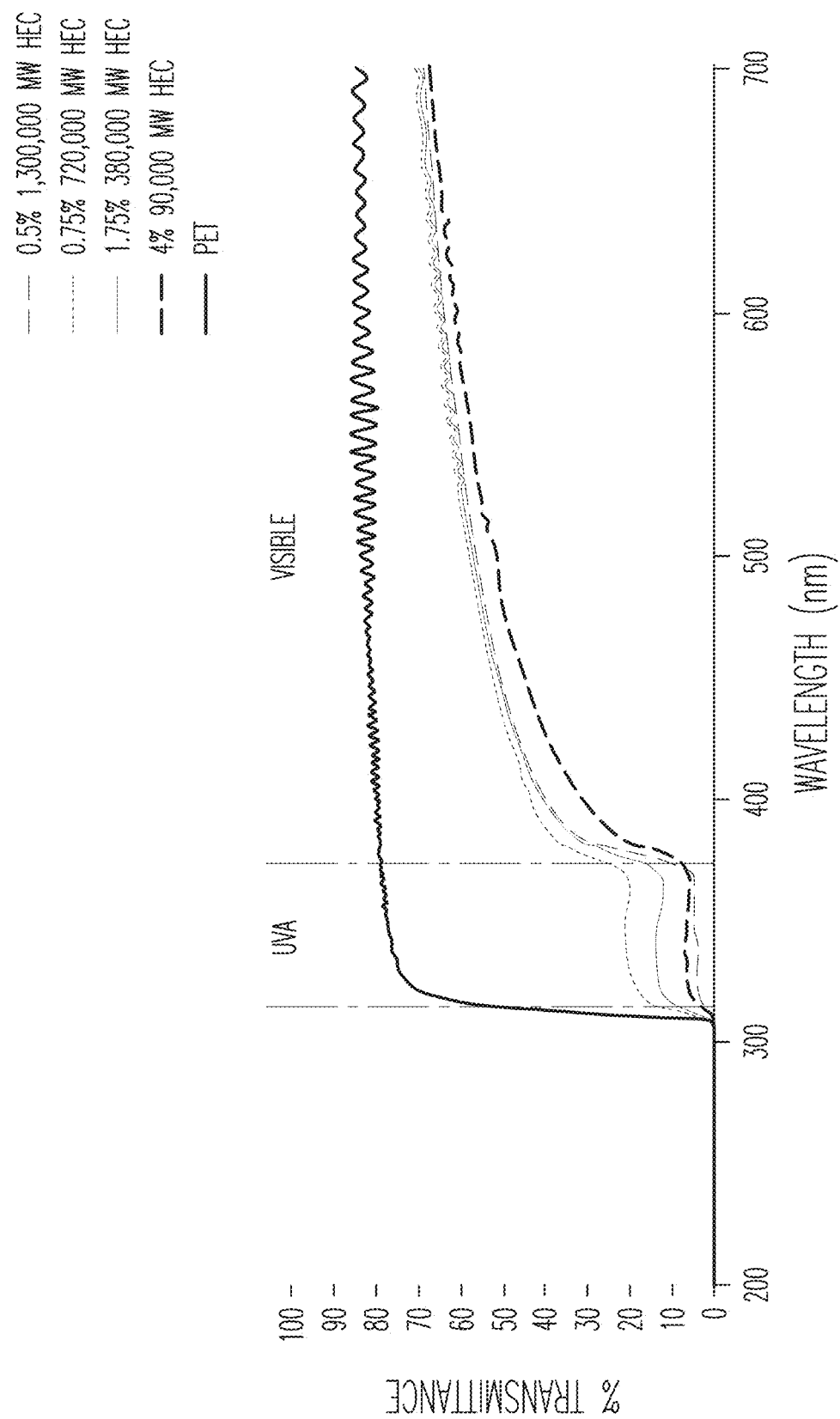
FIG. 11 illustrates percent transmittance versus wavelength for films formed using HEC of various molecular weights, in accordance with various embodiments.

Molecular weight of the polymeric binder can also affect the coating performance. Two molecular weights of hydroxyethyl cellulose were analyzed: a high molecular weight of 1,300,000 g/mol and a significantly lower molecular weight of 90,000 g/mol. It is well known that increasing molecular weight enhances the level of polymeric entanglements, and the extended persistence lengths of HEC promote long range interactions in the composite. Intuitively, it was found that the larger molecular weight of modified cellulose became significantly more viscous at comparable loading levels of 90,000 g/mol HEC. For ease of processing the material, the viscosities were equated at ~65 cP via the Brookfield viscometer. With these results in mind, the 1,300,000 g/mol HEC concentration was set at 0.5 wt %, eight times lower than 90,000 g/mol at 4 wt %. Interestingly, though the difference in weight and dosing is significant, the UV performance is comparable with >90% UV-blocking and ~70% visible transparency for both formulations. The likeness in UV blocking among binder molecular weights verifies similarities in aggregate structure morphologies, however, the reduced solids content in the high molecular weight solution yields a much thinner and concentrated film, according to SEM (FIG. 1(a)-(b)). The eight-fold difference in binder concentration is clearly visualized in the micrographs, and 90,000 g/mol HEC (FIG. 1(a)) is approximately ten times thicker than 1,300,000 g/mol (FIG. 1(b)) with composite thicknesses of 2 μm and 0.2 μm respectively. Therefore, though film thickness is a vital aspect of consideration (especially for transparency), it appears that the binder identity is of higher value in the evaluation of composite performance. FIG. 11 illustrates percent transmittance versus wavelength for films formed using HEC of various molecular weights.

In conclusion, a bio-based transparent UV-absorbing coating with unique aggregation patterns of nanoparticles was formulated. It was found that the choice of polymeric binder greatly impacts the nanoparticle cluster morphology, with the rigidity of hydroxyethyl cellulose stimulating the formation of fractal branch-like structures. Alternatively, the flexible HES promotes the formation of large, dense globules of particles which inhibit the capabilities of the composite. Though ZnO has the inherent ability to absorb UV light, it was found that the specific aggregation morphologies are essential to achieve transparency and high UV blocking efficacy. HEC is the most effective binder and the resulted cluster morphologies can be extended to various molecular weights, with the only variation being thickness at the expense of augmented viscosity. The overall thickness of the composite ranges from 0.2-2 plm, which is significantly thinner than similar reported technologies. The combination of composite capabilities, molecular architecture, and thickness provide a new solution to the continual issue of UV degradation. The high UV blocking and transparency properties of this nanocomposite grant it applicability in a variety of fields, such as food packaging. When the coating is applied to flexible plastic packaging materials, visual transparency is maintained, allowing for customers to see through while enhancing the shelf life of sensitive food products.

Example 3. Hydroxypropyl Cellulose (HPC) as Matrix

Figure 12:
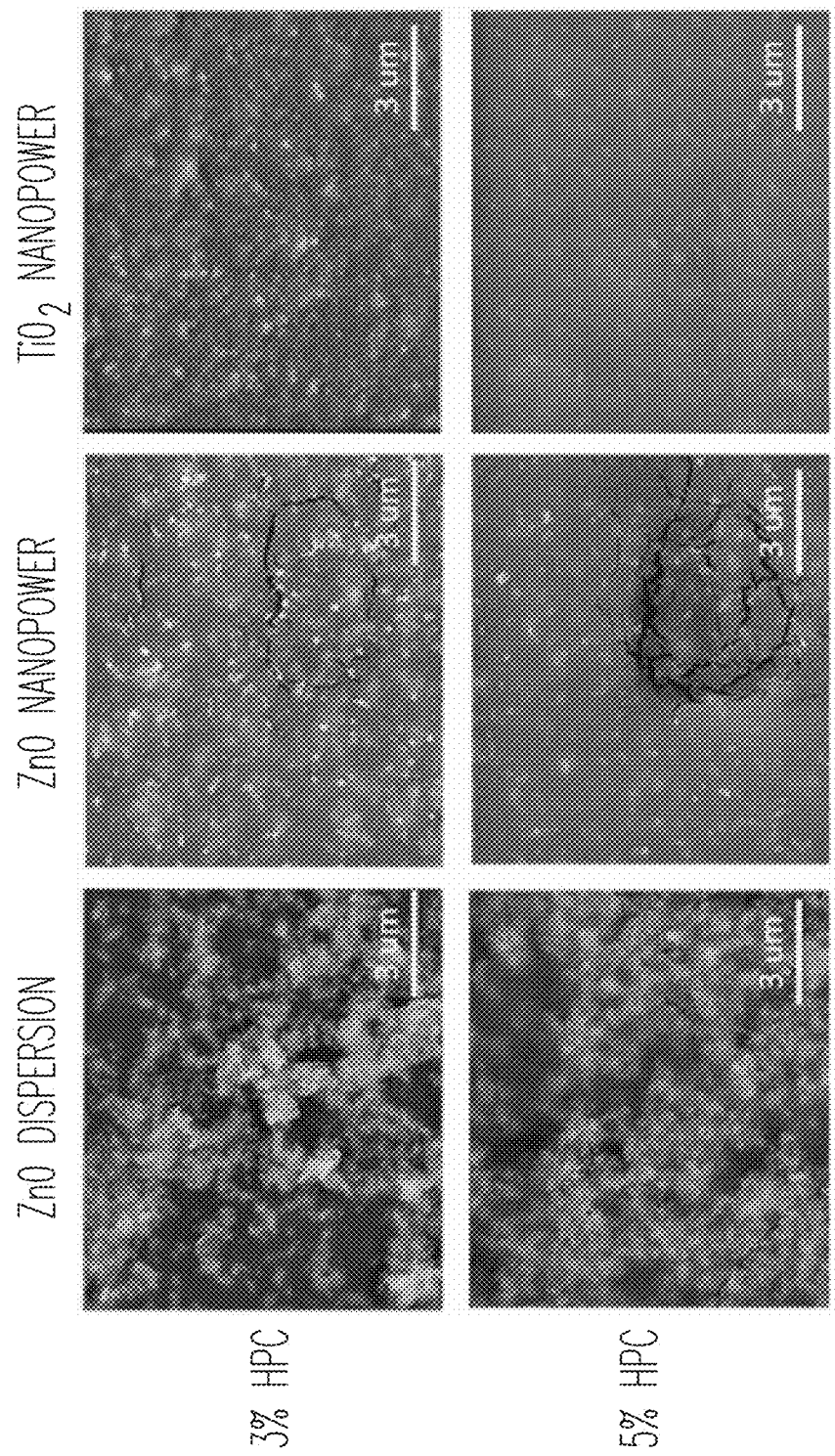
FIG. 12 illustrates SEM micrographs of 3 or 5 wt % hydroxypropyl cellulose coatings with ZnO dispersion. ZnO nanopowder, or $TiO_2$ nanopowder, in accordance with various embodiments.

HPC was been introduced into the coating system since it has structural similarities to hydroxyethyl cellulose (HEC), with the only difference being a methyl substituent. Following the procedure of Example 1, HPC having a molecular weight of 80,000 g/mol was tested with a zinc oxide dispersion, titanium dioxide nanopowder, or zinc oxide nanopowder. The zinc oxide dispersion included Tween 20 as a chemical dispersant. The titanium dioxide and zinc oxide nanoparticles included sodium polyphosphate chemical dispersant. Nanoparticles were dosed at 3 and 5 weight percent, based on the dried weight of the film. FIG. 12 illustrates SEM micrographs of 3 or 5 wt % hydroxypropyl cellulose coatings with ZnO dispersion, ZnO nanopowder, or TiO$_2$ nanopowder, and chemical dispersants. As shown in FIG. 12, the ZnO dispersion (with Tween 20) formed similar fractal patterns to those observed with HEC.

Figure 13:
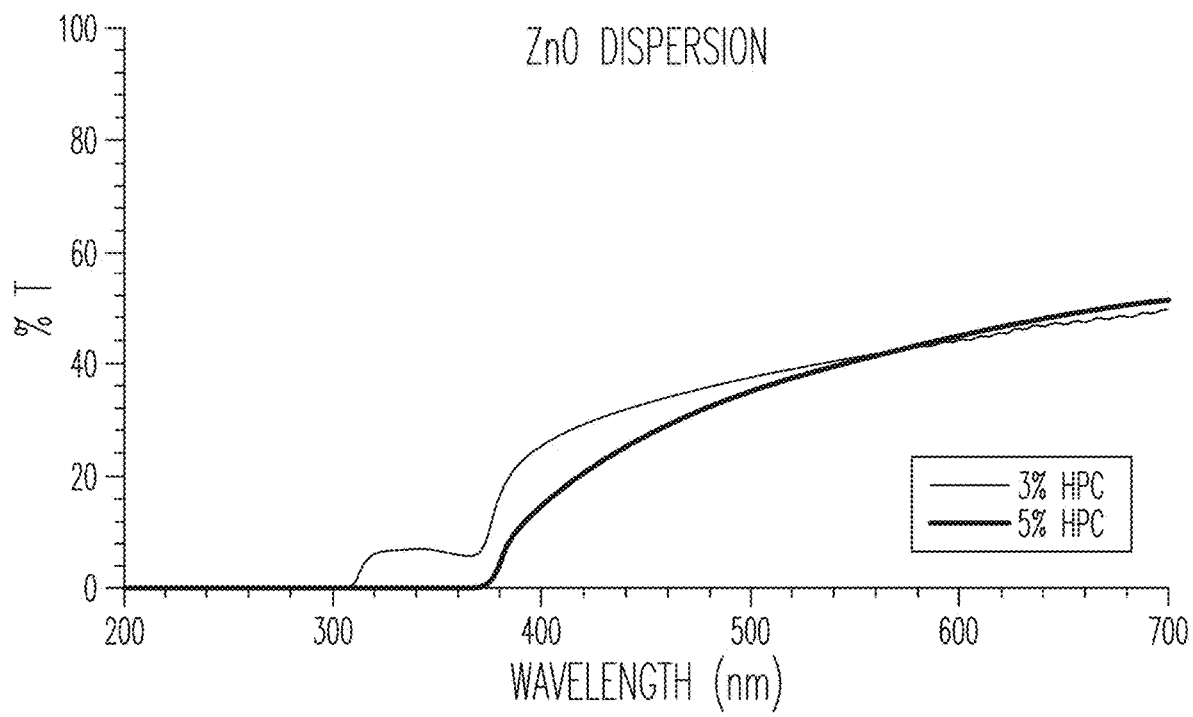
FIG. 13 illustrates a UV-Vis spectrum of a film formed from a ZnO dispersion in a 3 or 5 wt % HPC matrix with Tween 20 chemical dispersant, in accordance with various embodiments.
Figure 14:
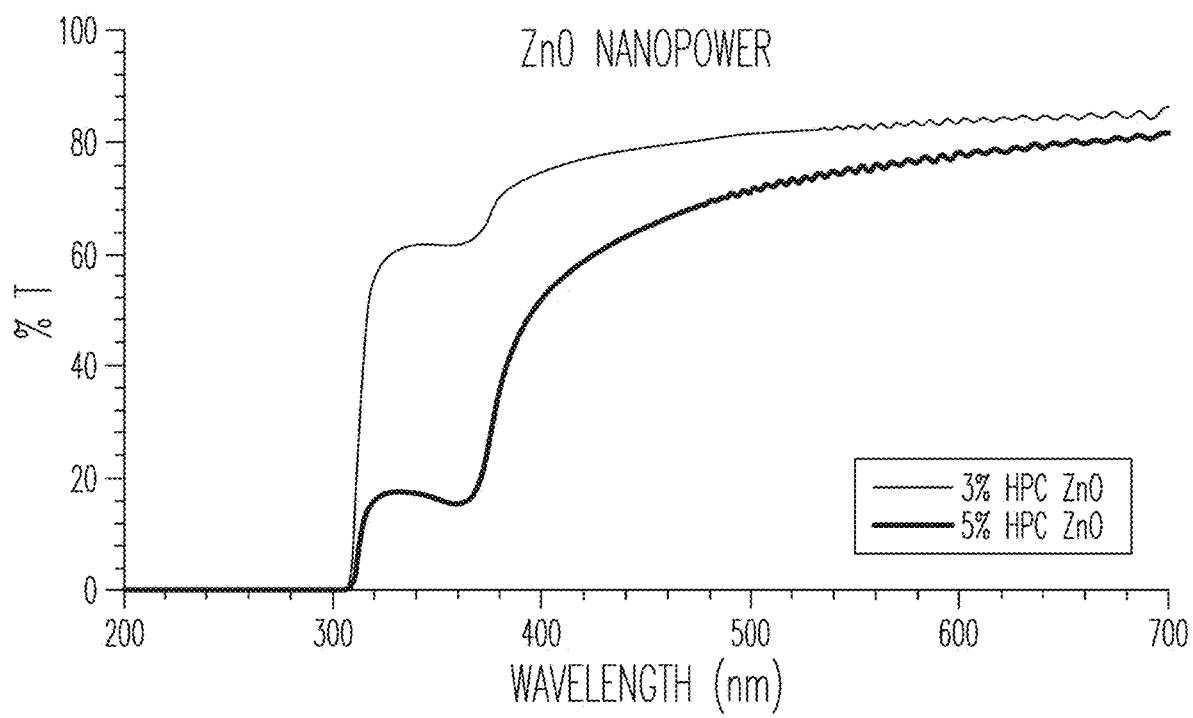
FIG. 14 illustrates a UV-Vis spectrum of a film formed from a ZnO nanopowder in an 3 or 5 wt % HPC matrix with sodium polyphosphate chemical dispersant, in accordance with various embodiments.
Figure 15:
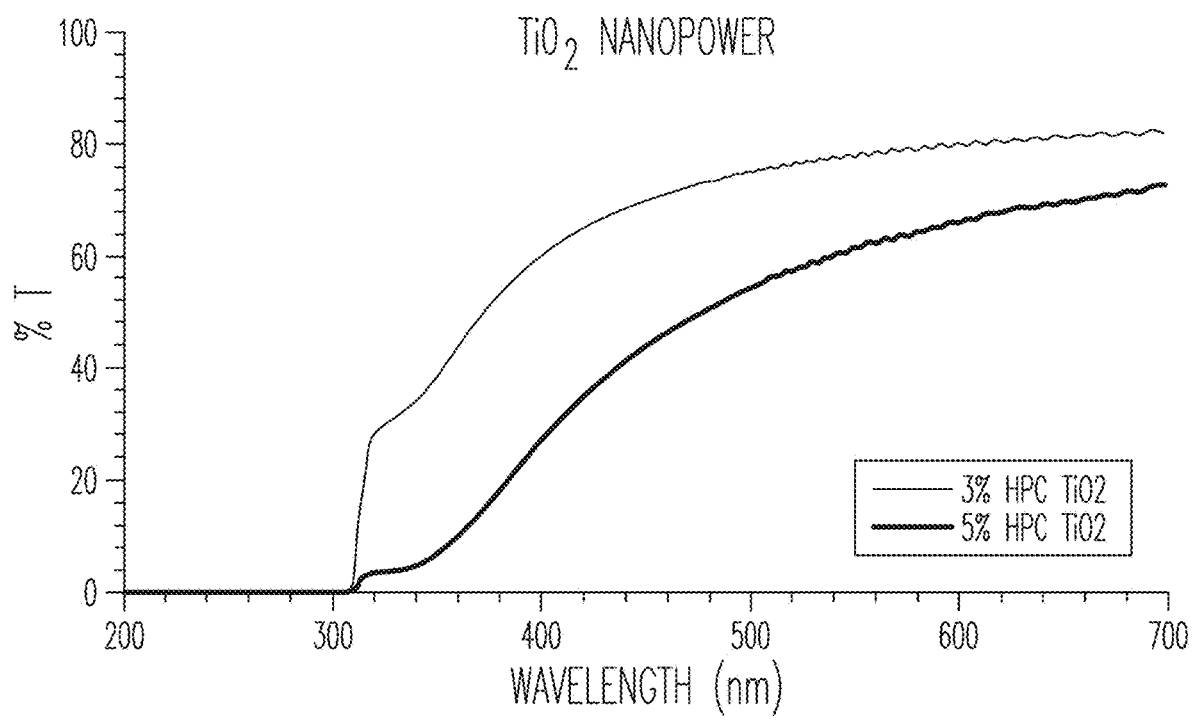
FIG. 15 illustrates a UV-Vis spectrum of a film formed from a $TiO_2$ nanopowder in a 3 or 5 wt % HPC matrix with sodium polyphosphate chemical dispersant, in accordance with various embodiments.

The UV-Vis spectra of the HPC films was measured to assess the impact of assembly and matrix dosing on light blocking properties. FIG. 13 illustrates a UV-Vis spectrum showing transparency versus wavelength for the ZnO dispersion. FIG. 13 shows that the ZnO dispersion coating showed the greatest amount of UV blocking (90-100% depending on polymer dosage), though the transparency was reduced (50%). FIG. 14 illustrates a UV-Vis spectrum of a film formed from a ZnO nanopowder in an 3 or 5 wt % HPC matrix with sodium polyphosphate chemical dispersant. FIG. 14 shows that the UV blocking was decreased for the ZnO nanopowder, though its transparency was shown to increase (85%). FIG. 15 illustrates a UV-Vis spectrum of a film formed from a TiO$_2$ nanopowder in a 3 or 5 wt % HPC matrix with sodium polyphosphate chemical dispersant. FIG. 15 shows that TiO$_2$ demonstrated 5-30% UV blocking and 70-80% transparency.

Example 4. Formulation of Coating for Spray Coating Applications

Figure 16A:
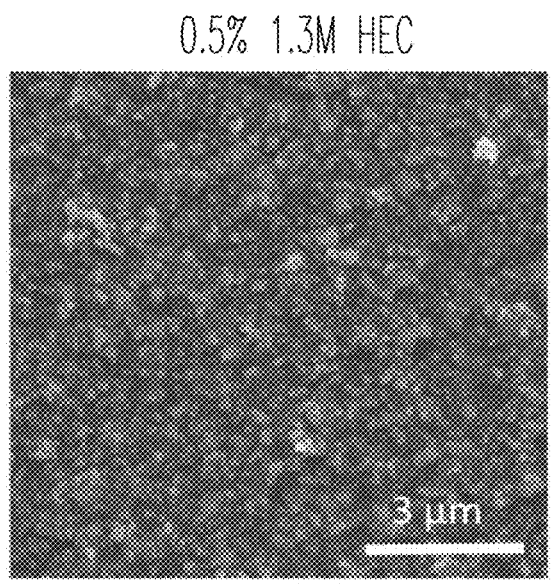
FIGS. 16a-b illustrate SEM images of spray cast coatings including a ZnO dispersion, 0.5 or 4 wt % HEC, and Tween 20, in accordance with various embodiments.
Figure 16B:
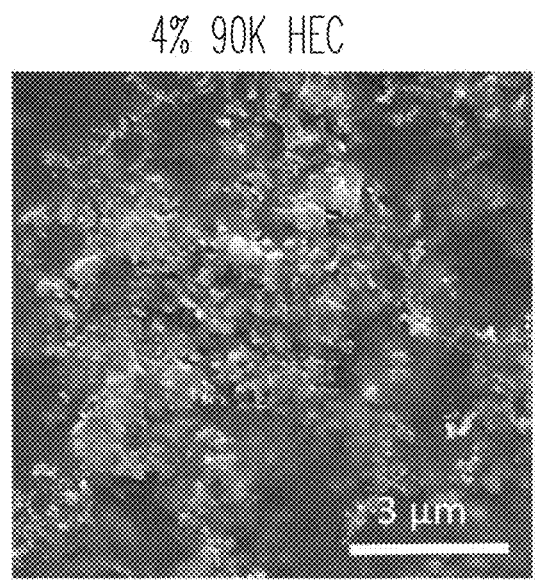
Figure 17:
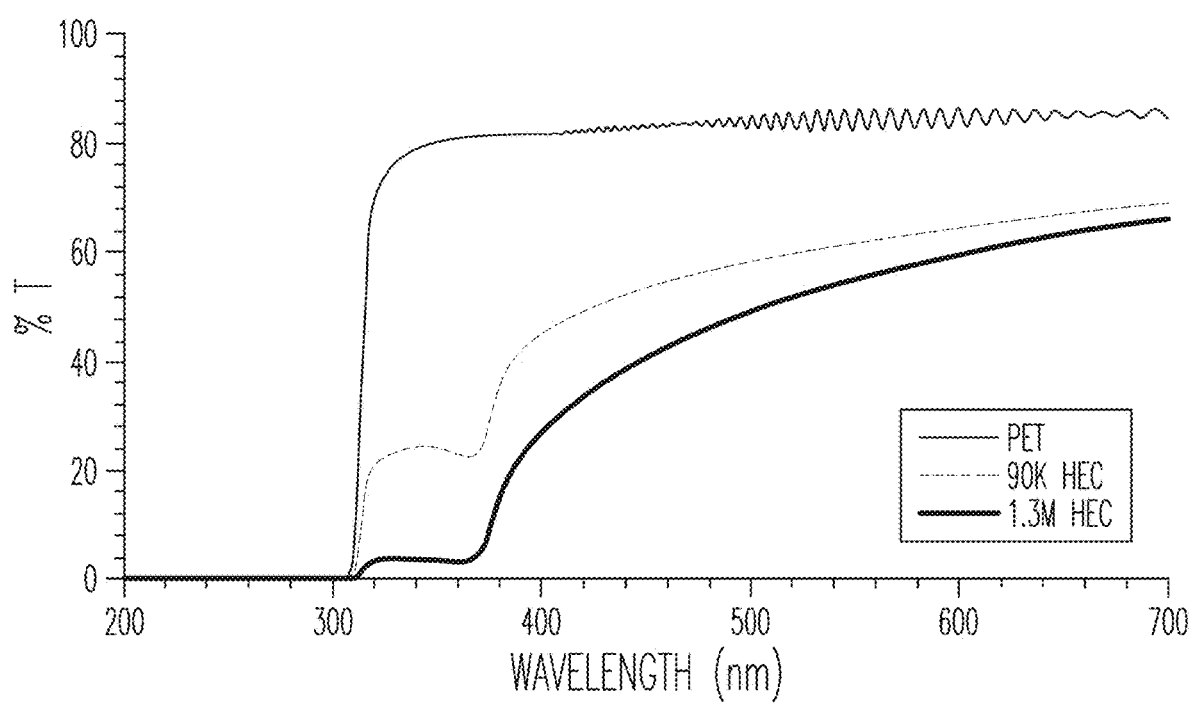
FIG. 17 illustrates UV-Vis spectra of spray cast coating including a ZnO dispersion, HEC (90,000 and 1,300,000 g/mol), and Tween 20, in accordance with various embodiments.

The coating was applied via spray gun to the substrate to assess whether the process is scalable. Due to the enhanced UV-blocking capacity. ZnO (in dispersion form with 1,300,000 and 90,000 g/mol HEC) was used as a model system, following the procedure described in Example 1 but using the spray gun instead of drawing down the formulation. FIGS. 16a-b illustrate SEM images of spray cast coatings including a ZnO dispersion, 0.5 or 4 wt % HEC, and Tween 20. FIGS. 16a-b show that the process is indeed scalable, and that the structures follow the similar assembly pattern when the coating is sprayed and cast. To assess whether spraying impacts the optical properties of the film the UV-vis spectrum was also measured, with FIG. 17 illustrating a UV-Vis spectrum of a firm formed by spray cast coating including a ZnO dispersion, HEC (90,000 and 1,300,000 g/mol), and Tween 20. FIG. 17 demonstrates that the spray cast films behave similarly to the similar coatings of Example 1.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

EXEMPLARY EMBODIMENTS

The following exemplary embodiments are provided, the numbering of which is not to be construed as designating levels of importance:

Embodiment 1 provides a UV-absorbing coating comprising:
ZnO nanoparticles;
a binder comprising hydroxy($C_1$-$C_{10}$)alkyl cellulose;
a dispersant; and
less than about 5 wt % water.

Embodiment 2 provides the coating of Embodiment 1, wherein the coating is a nanocomposite.

Embodiment 3 provides the coating of any one of Embodiments 1-2, wherein the ZnO particles are bridged together by the binder.

Embodiment 4 provides the coating of any one of Embodiments 1-3, comprising branch-like clusters comprising the ZnO nanoparticles that are bridged together with the binder.

Embodiment 5 provides the coating of any one of Embodiments 1-4, comprising a fractal hierarchical self-assembly of the ZnO nanoparticles.

Embodiment 6 provides the coating of any one of Embodiments 1-5, wherein the coating is a dried coating.

Embodiment 7 provides the coating of any one of Embodiments 1-6, wherein the coating is a flexible coating.

Embodiment 8 provides the coating of any one of Embodiments 1-7, wherein the coating has a thickness of about 0.01 microns to about 100 microns.

Embodiment 9 provides the coating of any one of Embodiments 1-8, wherein the coating has a thickness of about 0.2 microns to about 2 microns.

Embodiment 10 provides the coating of any one of Embodiments 1-9, wherein the coating has high visual transparency.

Embodiment 11 provides the coating of any one of Embodiments 1-10, wherein the coating has a visible transmittance (600 nm) of greater than about 60%.

Embodiment 12 provides the coating of any one of Embodiments 1-11, wherein the coating has a visible transmittance (600 nm) of 60% to about 90%.

Embodiment 13 provides the coating of any one of Embodiments 1-12, wherein the coating has a visible transmittance (600 nm) of about 70% to about 80%.

Embodiment 14 provides the coating of any one of Embodiments 1-13, wherein the coating has a UVA absorbance (354 nm) of greater than about 80%.

Embodiment 15 provides the coating of any one of Embodiments 1-14, wherein the coating has a UVA absorbance (354 nm) of about 80% to about 99%.

Embodiment 16 provides the coating of any one of Embodiments 1-15, wherein the coating has a UVA absorbance (354 nm) of about 90% to about 98%.

Embodiment 17 provides the coating of any one of Embodiments 1-16, wherein the coating comprises aggregates comprising the ZnO nanoparticles.

Embodiment 18 provides the coating of Embodiment 17, wherein the average squared distance from any point in the aggregates to their respective center of mass is about 120 nm to about 250 nm.

Embodiment 19 provides the coating of any one of Embodiments 17-18, wherein the average squared distance from any point in the aggregates to their respective center of mass is about 120 nm to about 180 nm.

Embodiment 20 provides the coating of any one of Embodiments 17-19, wherein the average number of ZnO particles in each aggregate is about 50 to about 4,000.

Embodiment 21 provides the coating of any one of Embodiments 17-20, wherein the average number of ZnO particles in each aggregate is about 500 to about 2.500.

Embodiment 22 provides the coating of any one of Embodiments 1-21, wherein the ZnO particles are silane-modified.

Embodiment 23 provides the coating of any one of Embodiments 1-22, wherein the ZnO nanoparticles have a particle size of about 1 nm to about 500 nm.

Embodiment 24 provides the coating of any one of Embodiments 1-23, wherein the ZnO nanoparticles have a particle size of about 20 nm to about 200 nm.

Embodiment 25 provides the coating of any one of Embodiments 1-24, wherein the ZnO nanoparticles are about 10 wt % to about 50 wt % of the coating.

Embodiment 26 provides the coating of any one of Embodiments 1-25, wherein the ZnO nanoparticles are about 20 wt % to about 35 wt % of the coating.

Embodiment 27 provides the coating of any one of Embodiments 1-26, wherein the weight ratio of the ZnO nanoparticles to the binder is about 0.001:1 to about 0.1:1.

Embodiment 28 provides the coating of any one of Embodiments 1-27, wherein the binder is about 10 wt % to about 50 wt % of the coating.

Embodiment 29 provides the coating of any one of Embodiments 1-28, wherein the binder is about 20 wt % to about 35 wt % of the coating.

Embodiment 30 provides the coating of any one of Embodiments 1-29, wherein the hydroxy($C_1$-$C_{10}$)alkyl cellulose comprises cellulose having about 10 mol % to about 90 mol % of hydroxy groups on the cellulose replaced with hydroxy($C_1$-$C_{10}$)alkyl-O— groups.

Embodiment 31 provides the coating of any one of Embodiments 1-30, wherein the hydroxy($C_1$-$C_{10}$)alkyl cellulose comprises cellulose having about 40 mol % to about 60 mol % of hydroxy groups on the cellulose replaced with hydroxy($C_1$-$C_{10}$)alkyl-O— groups.

Embodiment 32 provides the coating of any one of Embodiments 1-31, wherein the hydroxy($C_1$-$C_{10}$)alkyl cellulose is hydroxy($C_1$-$C_3$)alkyl cellulose.

Embodiment 33 provides the coating of any one of Embodiments 1-32, wherein the hydroxy($C_1$-$C_{10}$)alkyl cellulose is hydroxyethyl cellulose or hydroxypropyl cellulose.

Embodiment 34 provides the coating of any one of Embodiments 1-33, wherein the hydroxy($C_1$-$C_{10}$)alkyl cellulose has a molecular weight of about 10,000 g/mol to about 5,000,000 g/mol.

Embodiment 35 provides the coating of any one of Embodiments 1-34, wherein the hydroxy($C_1$-$C_{10}$)alkyl cellulose has a molecular weight of about 90,000 g/mol to about 1,300,000 g/mol.

Embodiment 36 provides the coating of any one of Embodiments 1-35, wherein the hydroxy($C_1$-$C_{10}$)alkyl cellulose has a molecular weight of about 800,000 g/mol to about 2,500,000 g/mol.

Embodiment 37 provides the coating of any one of Embodiments 1-36, wherein the binder further comprises hydroxy($C_1$-$C_{10}$)alkyl starch, hydroxyethyl starch, polylactide, keferin, benzophenone, a polymer, a polyurethane, an epoxy, an acrylic, or a combination thereof.

Embodiment 38 provides the coating of any one of Embodiments 1-37, wherein the dispersant is about 10 wt % to about 50 wt % of the coating.

Embodiment 39 provides the coating of any one of Embodiments 1-38, wherein the dispersant is about 20 wt % to about 35 wt % of the coating.

Embodiment 40 provides the coating of any one of Embodiments 1-39, wherein the dispersant is a surfactant.

Embodiment 41 provides the coating of any one of Embodiments 1-40, wherein the dispersant is sodium polyphosphate, polysorbate 20, or a combination thereof.

Embodiment 42 provides the coating of any one of Embodiments 1-41, wherein the coating further comprises a photostabilizing antioxidant.

Embodiment 43 provides the coating of any one of Embodiments 1-42, wherein the coating further comprises $TiO_2$ nanoparticles.

Embodiment 44 provides the coating of any one of Embodiments 1-43, wherein the coating is a textile coating, a food coating, a component of a sunscreen, or a component of a plastic film.

Embodiment 45 provides the coating of any one of Embodiments 1-44, wherein the coating is a component of a plastic wrap, a food protection wrap, a meat packaging film, a plastic bottle, a plastic bag, or a combination thereof.

Embodiment 46 provides a textile coating, sunscreen, food coating, or plastic film comprising the coating of any one of Embodiments 1-45.

Embodiment 47 provides the coating of any one of Embodiments 1-45, wherein the coating comprises less than about 1 wt % water.

Embodiment 48 provides the coating of any one of Embodiments 1-45, wherein the coating comprises about 0.001 wt % water to about 1 wt % water.

Embodiment 49 provides the coating of any one of Embodiments 1-45 or 47-48, wherein the coating is a dried product of a coating composition, the coating composition comprising:
the ZnO nanoparticles;
the binder comprising hydroxy($C_1$-$C_{10}$)alkyl cellulose;
the dispersant; and
water.

Embodiment 50 provides the coating of claim 49, wherein the ZnO nanoparticles are about 0.1 wt % to about 10 wt % of the coating composition.

Embodiment 51 provides the coating of any one of Embodiments 49-50, wherein the ZnO nanoparticles are about 0.5 wt % to about 1 wt % of the coating composition.

Embodiment 52 provides the coating of any one of Embodiments 49-51, wherein the binder is about 50 wt % to about 99.9 wt % of the coating composition.

Embodiment 53 provides the coating of any one of Embodiments 49-52, wherein the binder is about 80 wt % to about 99.5 wt % of the coating composition.

Embodiment 54 provides the coating of any one of Embodiments 49-53, wherein the dispersant is about 0.01 wt % to about 30 wt % of the coating composition.

Embodiment 55 provides the coating of any one of Embodiments 49-54, wherein the dispersant is about 0.1 wt % to about 20 wt % of the coating composition.

Embodiment 56 provides a UV-absorbing coating comprising:
silane-modified ZnO nanoparticles having a particle size of about 20 nm to about 200 nm, wherein the ZnO nanoparticles are about 40 wt % to about 50 wt % of the coating;
a binder comprising hydroxyethyl cellulose or hydroxypropyl cellulose, wherein the binder is 20 wt % to about 35 wt % of the coating;
a dispersant that is about 20 wt % to about 35 wt % of the coating; and
less than about 1 wt % water;
wherein
the coating comprises aggregates comprising the ZnO nanoparticles, wherein the average squared distance from any point in the aggregates to their respective center of mass is about 120 nm to about 180 nm, and wherein the average number of ZnO particles in each aggregate is about 500 to about 2.500.
the coating has a visible transmittance (600 nm) of greater than about 70%,
the coating has a UVA absorbance (354 nm) of greater than about 90%, and
the coating has a thickness of about 0.2 microns to about 2 microns.

Embodiment 57 provides a method of making the coating of any one of Embodiments 1-45 or 47-55, the method comprising
applying a coating composition to a substrate, the coating composition comprising the binder, the ZnO nanoparticles, and the dispersant; and
drying the applied coating composition, to form the coating.

Embodiment 58 provides the method of Embodiment 57, further comprising combining a solution comprising the binder with a solution comprising the ZnO nanoparticles and the dispersant, to form the coating composition.

Embodiment 59 provides the method of Embodiment 58, further comprising sonicating or stirring the solution comprising the binder, the solution comprising the ZnO nanoparticles and the dispersant, or both, prior to combining the solutions to form the coating composition.

Embodiment 60 provides the method of any one of Embodiments 58-59, further comprising heating the solution comprising the binder, the solution comprising the ZnO nanoparticles and the dispersant, or both, prior to combining the solution comprising the binder and the solution comprising the ZnO nanoparticles and the dispersant to form the coating composition.

Embodiment 61 provides the method of any one of Embodiments 58-60, wherein the solution comprising the binder has a pH of about 8-9.

Embodiment 62 provides the method of any one of Embodiments 58-61, wherein the solution comprising the binder and the solution comprising the ZnO nanoparticles and the dispersant are aqueous solutions.

Embodiment 63 provides the method of any one of Embodiments 57-62, further comprising sonicating or stirring the coating composition, prior to applying the coating composition to the substrate.

Embodiment 64 provides the method of any one of Embodiments 57-63, further comprising heating the coating composition, prior to applying the coating composition to the substrate.

Embodiment 65 provides the method of any one of Embodiments 57-64, wherein drying comprises curing the applied coating composition.

Embodiment 66 provides the coating, coating composition, textile coating, sunscreen, food coating, plastic film, or method of any one or any combination of Embodiments 1-65 optionally configured such that all elements or options recited are available to use or select from.

What is claimed is:
1. A UV-absorbing coating comprising:
silane-modified ZnO nanoparticles having a particle size of about 20 nm to about 200 nm, wherein the ZnO nanoparticles are about 30 wt % to about 60 wt % of the coating;
a binder comprising hydroxy($C_1$-$C_{10}$)alkyl cellulose, wherein the binder is about 10 wt % to about 50 wt % of the coating;

a dispersant that is about 10 wt % to about 50 wt % of the coating; and less than or equal to about 1 wt % water;

wherein the coating comprises aggregates comprising the silane-modified ZnO nanoparticles, the average squared distance from any point in the aggregates to their respective center of mass is about 120 nm to about 250 nm, the average number of ZnO particles in each aggregate is about 50 to about 2,500, and the coating has a thickness of about 0.01 microns to about 100 microns.

2. The coating of claim 1, wherein the coating has a visible transmittance at 600 nm of 60% to about 90%.

3. The coating of claim 1, wherein the coating has a UVA absorbance at 354 nm of about 80% to about 99%.

4. The coating of claim 1, wherein the ZnO particles are silane-modified with triethoxysilane, alkyltrioxysilane, pentyltriethoxysilane, aminopropyltriethoxysilane, or a combination thereof.

5. The coating of claim 1, wherein the ZnO nanoparticles have a particle size of about 20 nm to about 80 nm.

6. The coating of claim 1, wherein the hydroxy($C_1$-$C_{10}$) alkyl cellulose is hydroxyethyl cellulose or hydroxypropyl cellulose.

7. The coating of claim 1, wherein the hydroxy($C_1$-$C_{10}$) alkyl cellulose has a molecular weight of about 10,000 g/mol to about 5,000,000 g/mol.

8. A textile coating, sunscreen, food coating, or plastic film comprising the coating of claim 1.

9. The coating of claim 1, wherein the coating comprises about 0.001 wt % water to about 1 wt % water.

10. A method of making the coating of claim 1, the method comprising applying a coating composition to a substrate, the coating composition comprising the binder, the silane-modified ZnO nanoparticles, and the dispersant; and drying the applied coating composition, to form the coating.

11. A UV-absorbing coating comprising:

silane-modified ZnO nanoparticles having a particle size of about 20 nm to about 200 nm, wherein the ZnO nanoparticles are about 40 wt % to about 50 wt % of the coating;

a binder comprising hydroxyethyl cellulose or hydroxypropyl cellulose, wherein the binder is about 20 wt % to about 35 wt % of the coating;

a dispersant that is about 20 wt % to about 35 wt % of the coating; and less than about 1 wt % water;

wherein the coating comprises aggregates comprising the silane-modified ZnO nanoparticles, wherein the average squared distance from any point in the aggregates to their respective center of mass is about 120 nm to about 180 nm, and wherein the average number of ZnO particles in each aggregate is about 500 to about 2,500, the coating has a visible transmittance at 600 nm of greater than about 70%, the coating has a UVA absorbance at 354 nm of greater than about 90%, and the coating has a thickness of about 0.2 microns to about 2 microns.

* * * * *

UNITED STATES PATENT AND TRADEMARK OFFICE
CERTIFICATE OF CORRECTION

PATENT NO. : 10,975,251 B2
APPLICATION NO. : 16/716168
DATED : April 13, 2021
INVENTOR(S) : Olson et al.

It is certified that error appears in the above-identified patent and that said Letters Patent is hereby corrected as shown below:

In the Specification

In Column 1, Line 16, delete "(320-400 nm)." and insert --(320-400 nm),-- therefor In Column 1, Line 18, delete "atmosphere." and insert --atmosphere,-- therefor In Column 1, Line 25, delete "packaging." and insert --packaging,-- therefor In Column 1, Line 61, delete "2.500." and insert --2,500.-- therefor In Column 3, Line 53, delete "dispersion." and insert --dispersion,-- therefor In Column 4, Line 31, delete "Y." and insert --Y,-- therefor In Column 4, Line 32, delete "Y." and insert --Y,-- therefor In Column 5, Line 1, after "material", insert --,--

In Column 8, Line 26, delete "esters." and insert --esters,-- therefor

In Column 8, Line 27, delete "esters." and insert --esters,-- therefor

In Column 8, Line 29, delete "oleate." and insert --oleate,-- therefor

In Column 8, Line 37, delete "monooleate." and insert --monooleate,-- therefor

In Column 8, Line 38, delete "40." and insert --40,-- therefor

In Column 8, Line 39, delete "60." and insert --60,-- therefor

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,975,251 B2

In Column 8, Lines 41-42, delete "n-decyl-p-D-glucopyranoside," and insert --n-decyl-β-D-glucopyranoside,-- therefor In Column 9, Line 51, delete "3.8.4," and insert --3.8, 4,-- therefor In Column 10, Line 32, delete "nm." and insert --nm,-- therefor In Column 10, Lines 38-39, delete "g/mol. Aldrich)." and insert --g/mol, Aldrich),-- therefor In Column 10, Line 40, delete "(28-30%." and insert --(28-30%,-- therefor In Column 10, Line 43, delete "230." and insert --230,-- therefor In Column 10, Line 45, delete "5000-Vis-NIR. Agilent." and insert --5000-Vis-NIR, Agilent,-- therefor In Column 11, Line 51, delete "function." and insert --function,-- therefor In Column 11, Line 52, delete "fractal" and insert --fractal,-- therefor In Column 11, Line 66, delete "(0.24 g)." and insert --(0.24 g),-- therefor In Column 13, Line 9, delete "K. Duong." and insert --K. Duong,-- therefor In Column 13, Line 9, delete "Vu." and insert --Vu,-- therefor In Column 13, Line 11, delete "Babei-Ghazvini" and insert --Babei-Ghazvini,-- therefor In Column 13, Line 12, delete "Pack," and insert --Pack.-- therefor In Column 13, Line 13, delete "Bussière." and insert --Bussière,-- therefor In Column 14, Line 20, delete "(a)" and insert --(α)-- therefor In Column 14, Line 21, delete "(3)." and insert -- (β).-- therefor In Column 14, Line 53, delete "5(a)." and insert --5(a),-- therefor In Column 16, Line 12, delete "8(a)-(c)." and insert --8(a)-(c),-- therefor In Column 16, Line 31, delete "plm," and insert --μm.-- therefor In Column 17, Line 46, delete "plm," and insert --μm.-- therefor In Column 18, Line 32, delete "capacity." and insert --capacity,-- therefor In Column 18, Line 41, after "film", insert --,--

In Column 18, Line 42, delete "UV-vis" and insert --UV-Vis-- therefor

In Column 19, Line 67, delete "2.500." and insert --2,500.-- therefor

In Column 22, Line 4, delete "2.500." and insert --2,500.-- therefor